US012145080B2

(12) United States Patent
Steinhagen et al.

(10) Patent No.: US 12,145,080 B2
(45) Date of Patent: *Nov. 19, 2024

(54) DEVICE AND METHOD FOR THE CONTINUOUS HIGH-PRESSURE TREATMENT OF BULK MATERIAL AND USE THEREOF

(71) Applicants: UHDE HIGH PRESSURE TECHNOLOGIES GMBH, Hagen (DE); thyssenkrupp AG, Essen (DE)

(72) Inventors: Volkmar Steinhagen, Hagen (DE); Ansgar Herber, Dortmund (DE)

(73) Assignees: UHDE HIGH PRESSURE TECHNOLOGIES GMBH, Hagen (DE); thyssenkrupp AG, Essen (DE)

( * ) Notice: Subject to any disclaimer, the term of this patent is extended or adjusted under 35 U.S.C. 154(b) by 733 days.

This patent is subject to a terminal disclaimer.

(21) Appl. No.: 17/415,835

(22) PCT Filed: Dec. 20, 2019

(86) PCT No.: PCT/EP2019/086552
§ 371 (c)(1),
(2) Date: Jun. 18, 2021

(87) PCT Pub. No.: WO2020/127889
PCT Pub. Date: Jun. 25, 2020

(65) Prior Publication Data
US 2022/0072447 A1 Mar. 10, 2022

(30) Foreign Application Priority Data
Dec. 21, 2018 (DE) ..................... 10 2018 222 881.7

(51) Int. Cl.
C08G 65/40 (2006.01)
B01D 11/02 (2006.01)
B01J 3/00 (2006.01)
B01J 8/10 (2006.01)
B01J 13/00 (2006.01)
B01J 19/20 (2006.01)
C08J 11/08 (2006.01)
A23F 5/24 (2006.01)
C12C 3/10 (2006.01)

(52) U.S. Cl.
CPC ...... *B01D 11/0246* (2013.01); *B01D 11/0203* (2013.01); *B01D 11/0207* (2013.01); *B01D 11/0219* (2013.01); *B01D 11/0226* (2013.01); *B01D 11/0234* (2013.01); *B01D 11/0238* (2013.01); *B01D 11/0253* (2013.01); *B01D 11/0284* (2013.01); *B01D 11/0288* (2013.01); *B01J 3/008* (2013.01); *B01J 8/10* (2013.01); *B01J 13/0091* (2013.01); *B01J 19/20* (2013.01); *C08J 11/08* (2013.01); *A23F 5/24* (2013.01); *C08J 2300/14* (2013.01); *C08J 2300/30* (2013.01); *C12C 3/10* (2013.01)

(58) Field of Classification Search
USPC .......................................................... 521/40
See application file for complete search history.

(56) References Cited

U.S. PATENT DOCUMENTS

| 2,292,716 A | 8/1942 | Pyzel |
| 2,539,732 A | 1/1951 | Donohue |
| 2,664,967 A | 1/1954 | Molstedt |
| 2,729,550 A | 1/1956 | Maycock et al. |
| 2,893,945 A | 7/1959 | Berg |
| 3,131,202 A | 4/1964 | Depmer |
| 3,826,737 A | 7/1974 | Pegels et al. |
| 3,894,128 A | 7/1975 | Seitetsu |
| 3,958,952 A | 5/1976 | Van Ginneken |
| 4,039,424 A | 8/1977 | Hyde et al. |
| 4,229,418 A | 10/1980 | Wijffels et al. |
| 4,258,011 A | 3/1981 | Prazmowski |
| 4,601,906 A | 7/1986 | Shindler |
| 4,778,588 A | 10/1988 | Brandes et al. |

(Continued)

FOREIGN PATENT DOCUMENTS

| CN | 1671905 A | 9/2005 |
| CN | 1827201 A | 9/2006 |

(Continued)

OTHER PUBLICATIONS

English Translation of International Search Report issued in PCT/EP2019/086552, dated Jul. 7, 2020.

*Primary Examiner* — Terressa Boykin
(74) *Attorney, Agent, or Firm* — thyssenkrupp North America, LLC

(57) ABSTRACT

An apparatus and method for high pressure treatment of bulk material by extraction and/or impregnation may involve high pressure treating bulk material in a high pressure treatment volume of a pressure vessel apparatus at a high pressure level, especially high pressure in the range from 40 to 1000 bar. The method comprises at least the three following step sequences that are each controllable individually: pressurization, high pressure treatment, and depressurization. The high pressure treatment is performed in a continuous manner in the high pressure treatment volume. The high pressure treatment volume or the entire pressure vessel apparatus is in a fixed arrangement during the high pressure treatment. The continuity of the high pressure treatment is ensured solely by means of the high pressure treatment volume. This especially enables engineering optimization of high pressure treatment processes, for example extraction.

18 Claims, 8 Drawing Sheets

(56) References Cited

U.S. PATENT DOCUMENTS

| | | |
|---|---|---|
| 5,290,950 A | 3/1994 | Raban |
| 5,290,959 A | 3/1994 | Rice |
| 5,382,414 A | 1/1995 | Lautenschlager |
| 5,456,385 A | 10/1995 | Poussin et al. |
| 5,688,473 A | 11/1997 | Lawrence et al. |
| 6,048,494 A | 4/2000 | Annapragada |
| 6,569,313 B1 | 5/2003 | Carroll et al. |
| 7,897,050 B2 | 3/2011 | Waibel |
| 11,612,831 B2 | 3/2023 | Steinhagen et al. |
| 2008/0300386 A1 | 12/2008 | Lazarev et al. |
| 2011/0226608 A1 | 9/2011 | Lautenschlager |
| 2016/0030860 A1 | 2/2016 | Mcghee |
| 2016/0114304 A1 | 4/2016 | Li |
| 2016/0270416 A1 | 9/2016 | Corey |
| 2017/0246557 A1 | 8/2017 | Skell |
| 2017/0291120 A1 | 10/2017 | Jackson |
| 2018/0030372 A1 | 2/2018 | Maki et al. |
| 2018/0257048 A1 | 9/2018 | Webster et al. |
| 2020/0261875 A1 | 8/2020 | Plais et al. |

FOREIGN PATENT DOCUMENTS

| | | |
|---|---|---|
| CN | 104780988 A | 7/2015 |
| DE | 864 309 C | 1/1953 |
| DE | 865 505 C | 2/1953 |
| DE | 878 188 C | 6/1953 |
| DE | 71 03 843 U | 2/1971 |
| DE | 3815726 A1 | 11/1989 |
| DE | 42 16 295 A | 11/1993 |
| DE | 199 46 146 A | 4/2001 |
| DE | 20119064 U1 | 5/2002 |
| DE | 20201949 U1 | 5/2002 |
| DE | 699 07 217 T2 | 3/2004 |
| DE | 102008039106 A1 | 3/2010 |
| DE | 202017007003 U1 | 3/2019 |
| EP | 0 222 207 A | 5/1987 |
| EP | 0 683 804 B | 4/2001 |
| EP | 1 681 387 A1 | 7/2006 |
| EP | 1701775 B1 | 9/2006 |
| EP | 1 725 706 B | 5/2012 |
| JP | 01293129 A | 11/1989 |
| JP | 2005-533937 A | 11/2005 |
| KR | 2010 0086297 A | 7/2010 |
| NL | 47526 C | 12/1939 |
| WO | 9922837 A1 | 5/1999 |
| WO | 2004105927 A2 | 12/2004 |
| WO | 10032260 A1 | 3/2010 |
| WO | 2017124106 A1 | 7/2017 |
| WO | 2019/122387 A | 6/2019 |

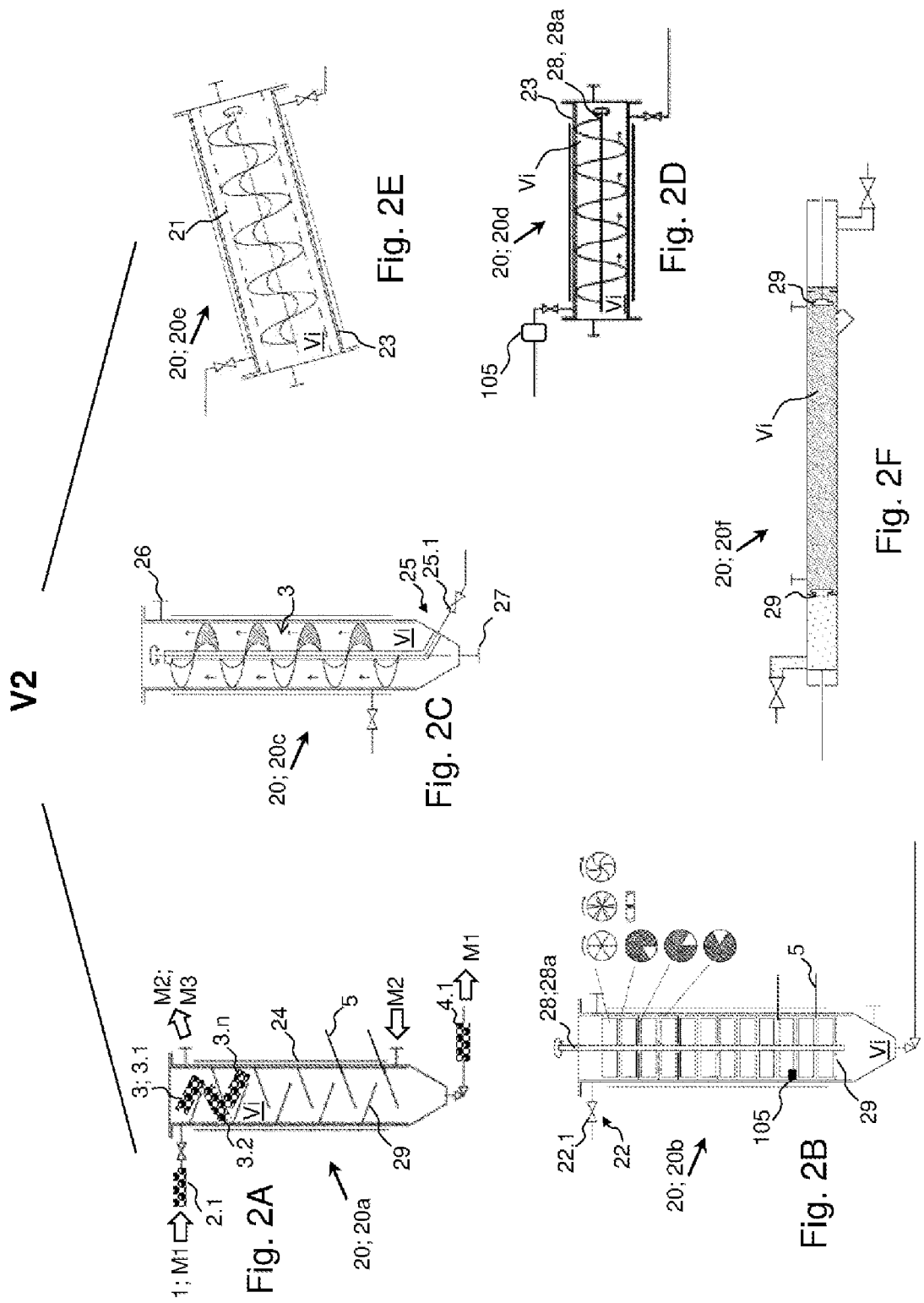

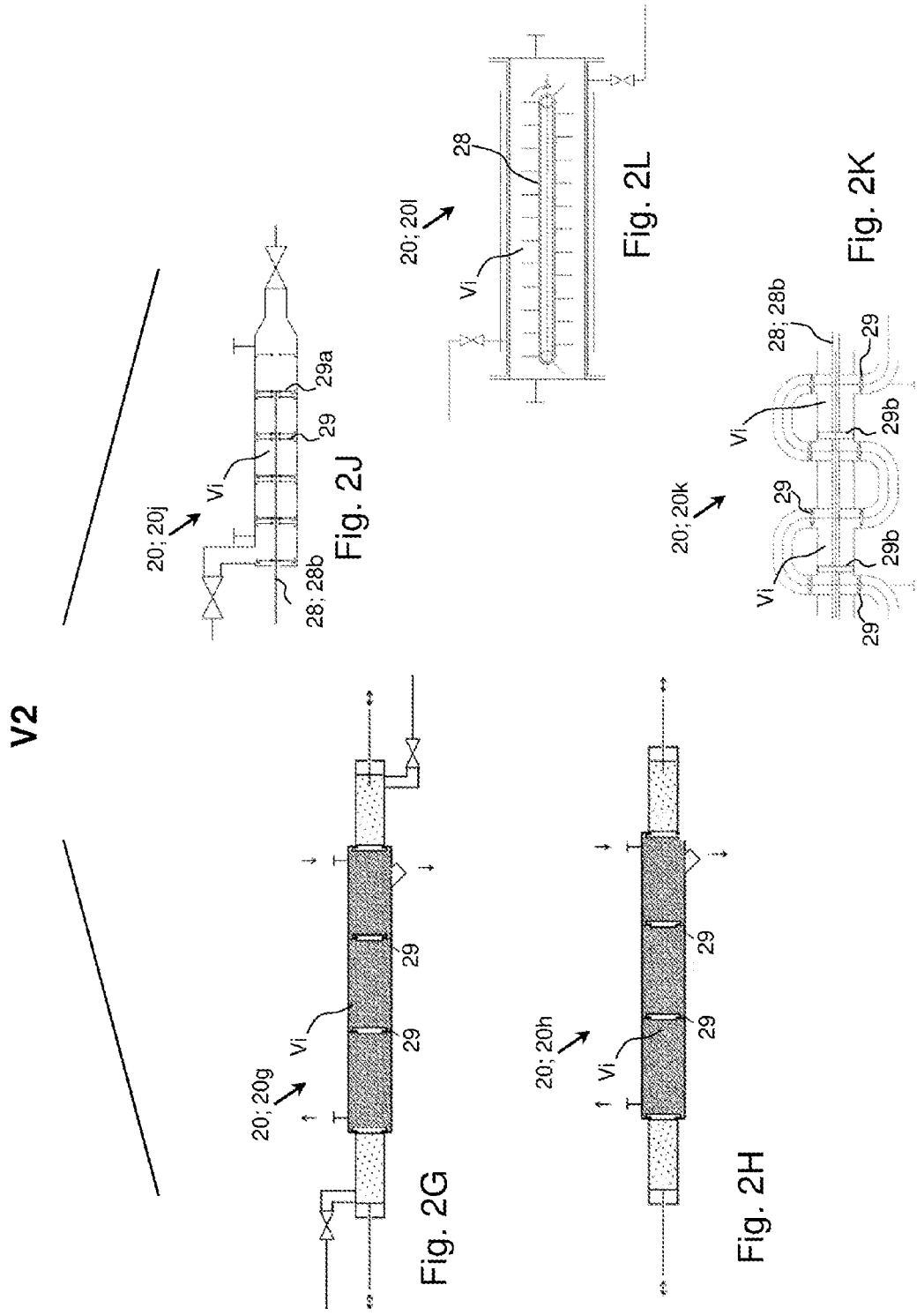

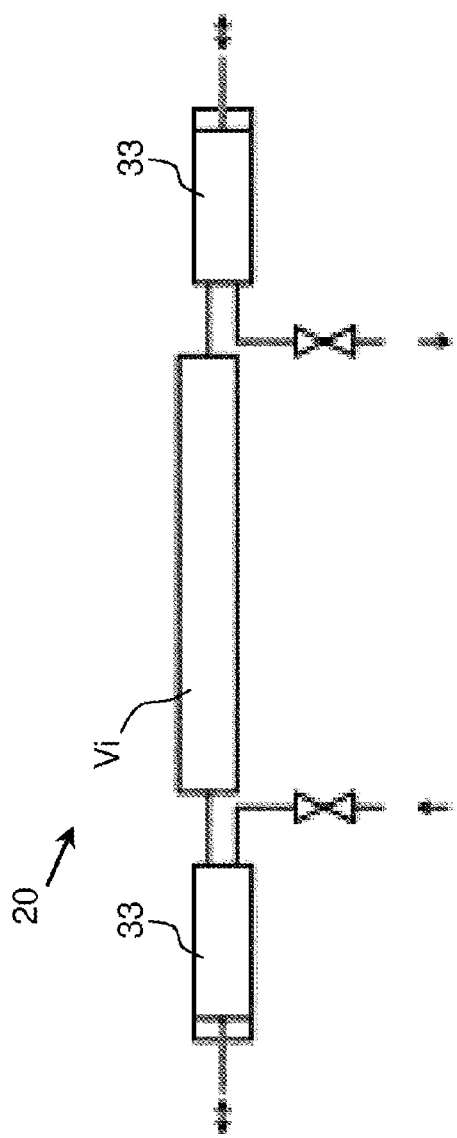
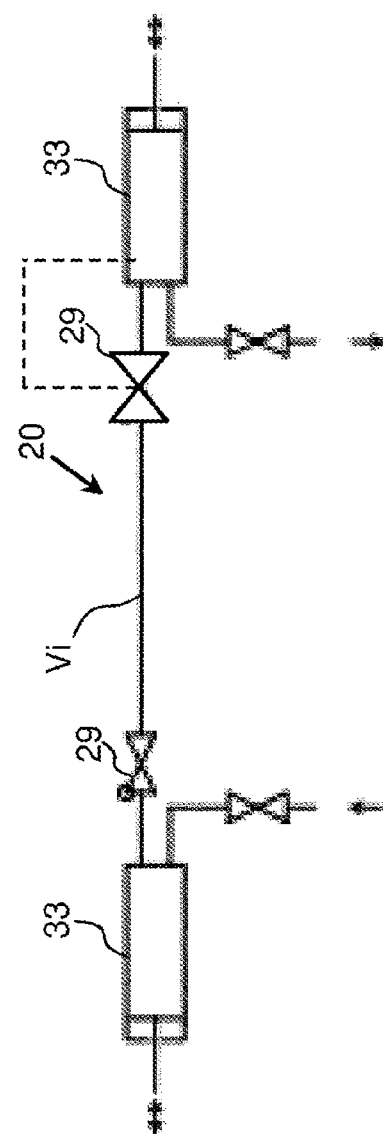

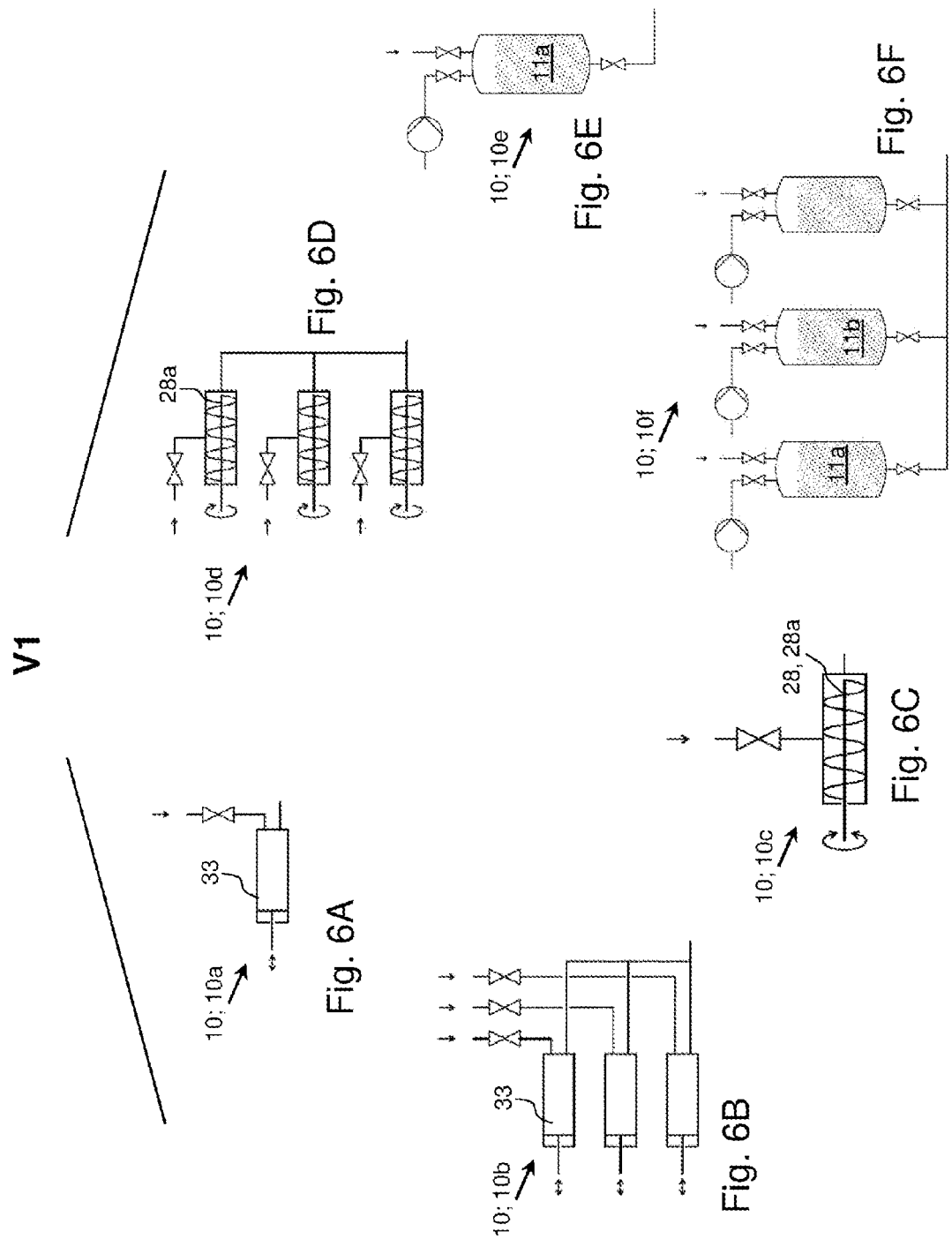

DEVICE AND METHOD FOR THE CONTINUOUS HIGH-PRESSURE TREATMENT OF BULK MATERIAL AND USE THEREOF

CROSS REFERENCE TO RELATED APPLICATIONS

This application is a U.S. National Stage Entry of International Patent Application Serial Number PCT/EP2019/086552, filed Dec. 20, 2019, which claims priority to German Patent Application No. DE 10 2018 222 881.7, filed Dec. 21, 2018, the entire contents of both of which are incorporated herein by reference.

FIELD

The present disclosure generally relates to apparatuses and methods for the continuous high pressure treatment of bulk material, including by extraction and/or impregnation.

BACKGROUND

In many cases, it is necessary to free bulk materials, especially in the form of granules, of substances, especially solvents. According to the application, the bulk materials are also subjected to a mere extraction without occurrence of solvents. The extraction can advantageously be effected under high pressure, especially at pressures above 100 bar, especially in conjunction with heating at an elevated temperature generated in a controlled manner. It is known that an extraction, especially extraction of solvent(s), can in many cases be effected preferentially with use of supercritical fluids or extraction media (e.g. carbon dioxide $CO_2$, propane, butane), especially since surface forces or surface tensions can be minimized here and the extraction is particularly effective, even with regard to a drying effect. Starting materials that may be subjected here to an extraction include both liquids (fluids in the liquid phase, especially also viscous fluids) and solids. Either the bulk material subjected to high pressure treatment (also to be referred to as raffinate in this state) or extracts obtained by extraction may be referred to as the product of high pressure treatment according to the application.

Prominent examples of extraction methods are the decaffeination of tea leaves, coffee beans or else extraction of hops. Since extraction is connected to the production of various intermediate user and end user products, especially also from the foods industry, there is also a comparatively high number of variants of extraction methods. This is also reflected in the construction and in the spectrum of size of the plants. It is not unusual, for example, to implement an extraction column having a height of more than 10 m, or to connect multiple extractors (pressure vessels) to one another to form a plant. In any case, a wide range of variation can be observed in the existing plant concepts, even with regard to variations in size.

For impregnation methods, whether they be performed separately or in combination with extraction, comparable examples can be enumerated.

To date, extraction, especially extractive solvent removal, in the case of bulk material or in the case of granules, has in many cases been effected by arranging the bulk material in an extractor (pressure vessel), especially in a layer with a defined maximum bed height, which layer is contacted with extraction medium (especially $CO_2$) that flows through it. The purpose of arrangement of the bulk material is typically served by a basketlike insert, also referred to as product accommodation basket, for example with a volume of about 250 liters and with a cylindrical outer wall, with a filter plate which is gas-permeable, in the form of wire braids, in the form of a perforated plate or manufactured from sintered metal, on which the insert is supported in the extractor. A filter lid of the basket may likewise be gas-permeable, in the form of wire braids, in the form of a perforated plate or manufactured from sintered metal. The basketlike insert may be inserted into the extractor in the region of a lid thereof and, after the extraction, the bulk material that has been largely freed of solvent can be transported away for further use by removal of the basketlike insert. The next charge can then be disposed in the extractor by means of the same insert or a further basketlike insert. In other words: the high pressure treatment method is performed chargewise, and the basketlike insert is also intended to facilitate the handling of the respective charge.

The manner of extractive solvent removal that has been customary to date requires a comparatively high level of labor and time. The handling of the basketlike insert cannot be automated in a simple manner. If the bulk material is hazardous, or if media or solvents that are combustible or harmful to health are used, a considerable level of expenditure is additionally also necessary with regard to safety, especially occupational safety or explosion protection, not least since personnel having specialist knowledge typically have to be involved for manual operations.

A disadvantage of existing apparatuses and methods is not just the handling of the bulk material (material flow) but also the dusts or gases that form, especially explosive gas mixtures, and impairments to the health of personnel involved. There is therefore an interest in simplifying high pressure treatment methods for bulk materials, especially for large amounts of bulk material, especially for extraction and/or impregnation.

JP 1293129 A describes a high pressure process wherein a reservoir vessel and a collecting vessel facilitate the chargewise provision of bulk material in the high pressure chamber, wherein the bulk material slides chargewise through a high pressure treatment chamber in a gravity-driven manner depending on the supply and discharge.

CN 1827201 A describes a high pressure treatment method in which the high pressure vessel is conveyed through a kind of airlock.

DE 42 16 295 A1 describes a method of high pressure treatment in which a vessel open on both sides is used, wherein a translational movement of a piston and multiple chamber regions ensure an advantageous throughput and an advantageous process regime.

EP 1 725 706 B1 describes the transfer of pretreated solids in suspension form to a high pressure stage.

Thus, a need exists for an apparatus and a method with which the high pressure treatment of bulk material can be simplified and the apparatus- or method-related complexity associated with high pressure treatment can be reduced, especially with maximum efficiency of the method (throughput per unit time). In particular, improved operational and/or occupational safety is needed. There is also a need for a high pressure treatment method of maximum (time) efficiency, specifically in the case of extraction, especially extraction of solvent(s), and/or in the case of impregnation, each in the case of quite different types of bulk material, so that the method—in spite of any optimization methods with regard

BRIEF DESCRIPTION OF THE FIGURES

FIGS. 2A-2L are cross-sectional side views of working examples for apparatuses set up for the second step sequence.

FIGS. 3A and 3B are cross-sectional side views of more example apparatuses set up for the second step sequence.

FIGS. 6A-6F are cross-sectional side views of yet other example apparatuses set up for the first step sequence.

DETAILED DESCRIPTION

Figure 1:
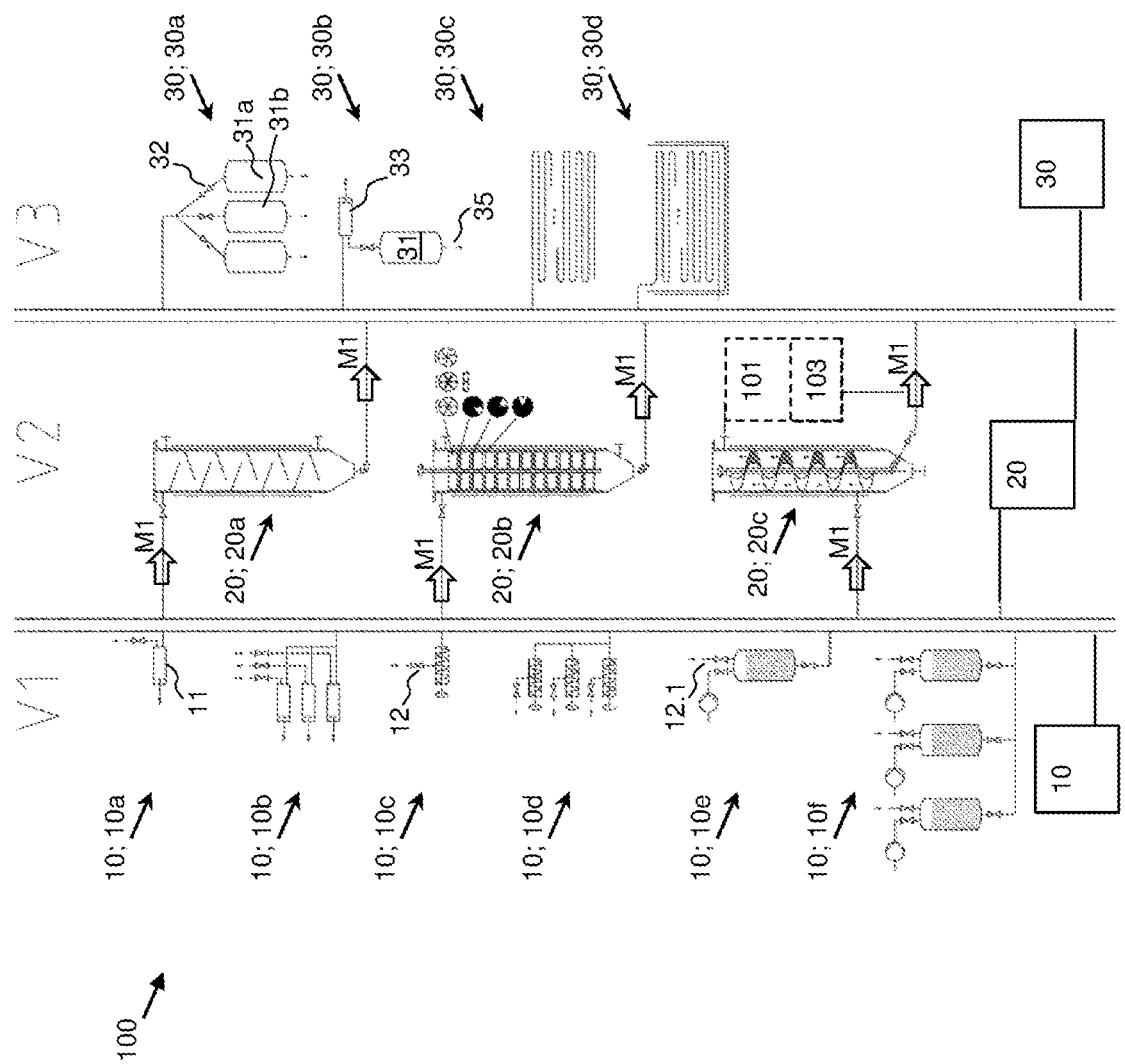
FIG. 1 is a schematic diagram or an at least partial cross-sectional side view of an overview of individual variants of a first, second, and third step sequence and the apparatuses provided for according to one working example.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to an apparatus for and to a method of continuous high pressure treatment of bulk material, especially by extraction and/or impregnation. The present disclosure further especially relates to the use of a pressure vessel apparatus for the continuous high pressure treatment of bulk material.

A solution to the problems described in the background can be achieved by a method of high pressure treatment of bulk material by extraction and/or impregnation, which bulk material is disposed in the high pressure treatment volume of a pressure vessel apparatus and is treated at a high pressure level, especially high pressure in the range from 40 to 1000 bar, under isolation from the environment, wherein the method comprises at least the three following step sequences that are each controllable individually (especially with regard to material flow): pressurization V1, high pressure treatment V2, depressurization V3.

What is proposed in accordance with the invention is that the high pressure treatment in the second step sequence V2 is performed in a continuous manner at the high pressure level in a closed system in the high pressure treatment volume, wherein the high pressure treatment volume or the entire pressure vessel apparatus is/remains (static) in a fixed arrangement during the high pressure treatment, and wherein the continuity of the high pressure treatment or of the high pressure treatment step sequence is assured solely by means of the one (single) high pressure treatment volume Vi. This enables simplifications in the process regime and can also ensure advantages with regard to a high throughput of bulk material (output volume). Advantages also arise specifically with regard to material flow of bulk materials of highly variable volume, especially also in the case of increases in volume by a factor in the range of 10, for example specifically in the case of drying.

It is possible here for the step sequences of pressurization V1 and depressurization V3 to be each controlled individually in a batch/chargewise manner for individual bulk material batches/charges as discontinuous processes, at least with regard to bulk material flow and/or pressure level, i.e. for them to be controllable separately from the continuous high pressure treatment and individually, especially independently of the material flow and high pressure conditions in the second step sequence. The discontinuous process regime may also comprise a pressurization and depressurization for individual batches of bulk material, where the size of the respective batch is independent of a charge or batch treated in the second step sequence V2.

The high pressure range from 40 to 1000 bar may also be differentiated further, according to the application. In particular, an advantageous high pressure range may be restricted to 40 to 400 bar or 50 to 300 bar and/or to 650 to 1000 bar. At particularly high pressures, it is especially also possible to adjust or vary the solution properties of the extraction medium. Advantages in terms of process technology may especially also arise in the high pressure range from 100 to 250 bar, especially 100 to 200 bar. It is optionally also possible to establish a pressure range below or above a critical point of an extraction medium used (for example $CO_2$).

The extraction medium used may either be a pure substance or else a substance mixture, especially in the case of process parameters above the critical point of the substance or above a critical line for a two-substance mixture or above a critical surface of a substance mixture composed of more than two substances (especially three-substance mixtures).

The examples of extraction elucidated hereinafter, synonymously with an extraction of solvents, may also refer to an extraction of substances (loading) other than solvents.

A continuous high pressure treatment is understood here to mean a high pressure treatment in which no process interruption resulting from pressure fluctuations and/or resulting from material flow is required for the high pressure treatment of the bulk material, but in which, instead, the high pressure treatment can optionally be performed continuously in an unchanged manner without interruption and (at least theoretically) without time limitation and (at least theoretically) without restriction in terms of the amount (mass, volume) of the bulk material treated, especially also in the case of continuous material flow within the high pressure treatment volume. In the case of continuous high pressure treatment, it is possible at any desired/any juncture to ensure the high pressure desired or required, especially also independently of preparatory and subsequent step sequences. There is no need to lower the high pressure level; more particularly, there is no need to lower the high pressure level in order to be able to ensure the flow of bulk material. The material flow may optionally be ensured here by continuous displacement, especially of at least one overall charge (no distinction between individual batches along the material flow pathway within the high pressure treatment volume), or by discontinuous displacement of an individual charge or of batches, especially in individual sections of the material flow pathway within the high pressure treatment volume. Any fluctuations in pressure are for technical reasons, for example as a result of the supply and/or the discharge of material. The continuous high pressure treatment may optionally also include the adjustment/control of a temperature level which is kept constant (as well as possible according to the application). The continuous high pressure treatment at a (single) predefined high pressure level that can be kept/controlled at a constant level within narrow tolerance limits enables an exact prior definition of extraction conditions or of process parameters for the high pressure treatment. This can also improve the quality of the product obtained.

It is optionally possible, in addition to the at least approximately constant high pressure level, to establish a temperature level within the high pressure treatment volume; it is especially possible to maintain a constant temperature. It is optionally possible to run a temperature cycle in the high pressure treatment volume, especially in association with the supply and/or discharge of material.

A fixed arrangement is understood here to mean a static arrangement in which the high pressure treatment volume or the corresponding high pressure treatment cavity bounded by the pressure vessel apparatus (or by the wall thereof) can remain in a fixed arrangement, that is to say without the need to assume any function with regard to bulk material displacement by displacement of the high pressure treatment volume. In any case, no displacement of the high pressure treatment volume relative to the further components of the arrangement is required. It is unnecessary for the high pressure treatment volume to fulfill any material flow function. In other words: it is not necessary in accordance with the invention for the high pressure treatment volume to be moved (either in absolute or relative terms) in order to ensure the continuity of the method. Instead, the bulk material can be supplied to the high pressure treatment volume and discharged therefrom again without having to interrupt the high pressure treatment. Within the high pressure treatment volume, it is optionally possible to conduct actuating movements, especially for definition of a particular manner of material flow, but the high pressure treatment volume may remain in a fixed arrangement. This facilitates not least the coupling to the first and third step sequence, and not least also results in advantages with regard to the pressure-tight configuration of the overall arrangement.

An individual or single high pressure treatment volume is understood here to mean a configuration in which the high pressure treatment need not be conducted in successive individual subvolumes, but in which the respective batch is disposed just once in a single vessel, in a single cavity or in a single volume and is subjected to high pressure treatment therein. The high pressure treatment volume may also be described as a high pressure treatment cavity surrounded by the pressure vessel apparatus in a high pressure-tight manner.

In many applications, much more time is required for an extraction phase than for an impregnation phase, especially in the case of a natural product extraction. The high pressure treatment time which is important for the design of the method can be defined primarily by the time required for the extraction. It is optionally possible for the start/end times (in the sense of a dwell time for the bulk material) of the respective phase of the high pressure treatment and the duration thereof to be adjusted individually in each case as a function of bulk material and medium.

It may also be the case here that a procedure with material flow and high pressure medium in countercurrent is advantageous. In the case of an extraction, the high pressure medium may correspond to an extraction medium used. According to the invention, the manner of guiding and onward conduction of bulk material and high pressure medium can be matched in a highly varied manner and very flexibly to the respective application (e.g. pressure level, type of bulk material, type of loading, type of extraction medium, type of solvent). It is optionally possible to convey high pressure medium, especially extraction medium, and bulk material in the same direction as well.

It may especially be the case here in extraction of solvent(s), especially also in the case of aerogels as starting material, that inclination of the pressure vessel apparatus or of the high pressure treatment volume to the horizontal is advantageous, especially with regard to outflow or discharge of liquid solvents. For this purpose, an advantageous angle has been found to be in the range from 10 to 30° relative to the horizontal or optionally also relative to the vertical. The inclination may be ascending or descending.

In the first step sequence V1, a high pressure is built up. This can especially be effected by two variants. It is firstly possible to provide a high pressure pump which may optionally also have multiple heads. It is alternatively also possible to use multiple high pressure pumps in parallel. Secondly, the first step sequence V1, in the case that the pressure has already been built up, may essentially be provided solely for the purpose of providing a respective bulk material charge for the pressure vessel apparatus or for the second step sequence V2.

For the third step sequence V3 (depressurization device), it is possible to provide multiple depressurization units or depressurization vessels. This can increase flexibility or variability with regard to discharge of bulk material. The depressurization is preferably effected in a discontinuous manner. For this purpose, the respective vessel can be shut off.

In the third step sequence V3, it is possible to provide a comparatively long depressurization conduit, especially immediately downstream of the second step sequence V2. The depressurization conduit enables an arrangement that is very simple and robust in terms of its construction and can minimize the method- or plant-related complexity for the depressurization V3.

It has been found that the arrangement of the invention or the procedure of the invention is advantageous especially also for bulk materials configured as aerogels (or aerogel bodies). Especially in the case of aerogels, extraction of solvents may be desirable/required. Especially in the case of aerogels (high-porosity solids), a change in volume, especially increase in volume, in the course of high pressure treatment may be particularly significant, for example by a factor of 10, or, in other words, for example, in the region of a 2-3-fold increase in radius. The variants described here for the implementation of material flow are advantageous especially also in the case of major changes in volume.

In one working example, all three step sequences V1, V2, V3 can be implemented by means of a tube or a tube coil, where the corresponding section of the tube in the third step sequence V3 may be configured as a depressurization conduit. One advantage here is largely arbitrary scalability (especially extension of the tube length), or comparatively high variability with regard to additional assemblies. It is advantageously possible to prevent back flow of the bulk material in a simple manner. It is advantageously possible to enable a high fill level. In other words: the available volume can be utilized efficiently.

The bulk material may remain in a fixed arrangement within the high pressure treatment volume until further bulk material is introduced via the first step sequence V1.

The invention relates to a method and to an apparatus by which the extraction can proceed continuously, especially in such a way that a cycle of loading, pressure buildup, high pressure treatment or extraction, depressurization and unloading that has at least to date been executed in batchwise operation in separate steps can be executed in a continuous manner at least with regard to the high pressure treatment or extraction, such that the manner of high pressure treatment can be decoupled from the preparatory and subsequent process steps. As well as advantages with regard to variability and individualizability and controllability of the high pressure treatment process, this can also achieve a higher production capacity than by means of a conventional arrangement (with comparable plant size). Method-related advantages can be achieved especially because the high pressure treatment need not be effected in a cycle chosen in the first step sequence V1 (pressurization) and/or in the third step sequence V3 (depressurization).

According to the invention, the granular material can be introduced into the high pressure vessel at extraction pressure and discharged again after a defined time without having to change the high pressure treatment level. It is possible here, for example, also to convey extraction medium continuously through the high pressure vessel.

By contrast, in the case of a discontinuous method regime executed batch/chargewise (batchwise operation), the starting material for the extraction in many cases may be layered only up to a particular height, especially in order to avoid excessive compression. There is a cyclical procedure here of charging a pressure vessel, pressurizing to high pressure and flow of an extraction medium through the vessel for high pressure treatment. Then the pressure vessel is depressurized and emptied again. In a discontinuous batch/chargewise method regime, the pressurization and high pressure treatment are dependent on the material flow. The material can flow only as a function of the pressure conditions. More particularly, depressurization has to be effected to a pressure well below the high pressure level required in order to be able to continue to convey the bulk material. The discontinuous chargewise process regime (batchwise operation) is therefore comparatively complex at least with regard to the fluctuations in pressure required, since at least one depressurization or reduction in pressure from the high pressure level is required in each case for a respective charge.

According to the invention, the pressure buildup, high pressure treatment and depressurization can be spatially separated from one another. In particular, in a first volume, the bulk material can be brought to pressure and conveyed into a second volume. The pressure in the second volume is the process pressure at all times, and so the high pressure treatment in the second volume can be effected. The bulk material (granular material) treated is then conveyed into a third volume in which the depressurization can be effected. There follows a description of working examples of the invention.

According to the invention, it is possible to free granular starting material (bulk material configured as granules, aerogel bodies, pellets, powder, beans and/or particles) extractively of a loading in a continuous manner, especially of solvent(s). Supercritical drying can also be effected here, especially by means of $CO_2$. The term "supercritical drying" is understood here to mean drying, especially in the manner of an extraction of solvents and/or water by means of an extraction medium (e.g. $CO_2$), the state of which is above the critical point (or above the critical line or surface).

One of the working examples (especially a first variant) may have the following components:
  pump set up to pressurize the granular material with high pressure in the first step sequence V1;
  pressurization device with at least one pressure vessel apparatus, especially configured as a high pressure extractor, especially as a vertically aligned extractor, for the second step sequence V2;
  conveying device, especially conveying screw, especially arranged along the longitudinal axis of the pressure vessel apparatus;
  introduction/outlet unit and optionally also introduction/discharge valve, especially each comprising a stub (connection); in this case the outlet unit may be part of an outlet fitting, especially also comprising a downpipe;
  depressurization device with at least one depressurization vessel (depressurization unit), for the third step sequence V3.

Illustrative mode of function: granular material or bulk material is fed under high pressure into the pressure vessel apparatus, especially guided to the lower end of a conveying device. Optionally, a/the conveying device conveys the bulk material within the high pressure treatment volume, especially in the upward direction and further into a downpipe. At the same time, extraction medium, especially $CO_2$, is introduced into the high pressure treatment volume by a stub (connection) and flows through the bed in countercurrent, frees it of solvent and leaves the high pressure treatment volume again through a further stub. Liquid solvent collects at the base of the high pressure treatment volume, where it is discharged through a stub or outlet. After being discharged from the high pressure treatment volume, the bulk material is guided into one of several depressurization vessels. These are shut off with a valve, and then the depressurization can be effected.

A further working example (especially a second variant) may have, in a modification of or supplementation of the above-described variant, the following components:
  horizontally or slightly inclined pressure vessel apparatus with extractor;
  conveying device, especially conveying screw, especially with its longitudinal axis in the same alignment as the pressure vessel apparatus, especially in horizontal or slightly inclined alignment.

The conveying device is especially disposed within a tube made of perforated sheet metal or wire mesh, which is permeable to fluids, but acts as isolation for the bulk material.

Further illustrative mode of function: the bulk material, as already described, is brought to pressure and introduced into the extractor at the corresponding stub. Within a predefinable unit of time, the bulk material is conveyed through the extractor by means of the conveying device, while $CO_2$ is simultaneously guided through the extractor, for extraction of the solvent from the bulk material. Liquid solvent may pass here through a liquid-permeable wall and be collected and discharged at an exit point (outlet), especially at the bottom of the extractor. The bulk material falls into an exit stub at one end of the extractor. The depressurization can be executed as in the variant described above.

Alternatively, for the depressurization, it is also possible to use a piston motor with a reversed mode of function in relation to the pump. This is preferably connected such that mechanical energy is recovered, which is preferably used to build up the pressure in the first step sequence V1. Both processes (compression and depressurization) are then preferably mechanically coupled. As a further embodiment, depressurization can be implemented via the pressure drop in a long depressurization conduit. In other words: the continuity of the high pressure treatment can also be advantageous from an energy point of view, especially in the case of use of a decompression motor. A decompression motor is understood here to mean a unit set up to draw energy from the high pressure medium via mechanical work in the depressurization, especially by means of pistons or turbines driven by the high pressure medium.

For example, in the third step sequence V3, a depressurization can be effected in at least two different variants: depressurization in or by means of a pressure-driven piston; depressurization in a predefined depressurization volume (cavity having predefined size/geometry). There may also be a pressure transfer here. In this case, a change in volume can also be effected directly in the outlet fitting, in the case of a variable transfer cavity (especially provided by a pressure-driven piston). Depressurization energy can be recovered by means of the piston.

A further working example (especially a third variant) may have, in a modification or supplementation of the two variants described above, the following components: pressure vessel apparatus configured as a tube or tube coil.

The second step sequence V2 here may especially be implemented in series with the first and third step sequences V1, V3, in which case the first and/or third step sequence V1, V3 may also be at least partly integrated into the tube.

Further illustrative mode of function: the bulk material is pressurized by means of at least one pump in the first step sequence V1 and conveyed into the high pressure treatment volume of the pressure vessel apparatus. There is countercurrent flow (especially of $CO_2$) through the high pressure treatment volume, in order to achieve extraction. The $CO_2$ is introduced at one stub and leaves the tube at a further stub. Liquid solvent is led off at a further stub. The stubs are each equipped with retaining devices for bulk material, for example with sieve plates. At the outlet end of the tube, preparation is made for depressurization by the third step sequence V3, especially by means of a piston motor.

The tube may be/have been divided here into different regions with externally operable/openable nonreturn valves, especially in order to be able to ensure controlled conveying of the bulk material through the tube.

It is advantageously possible for the pressure vessel apparatus to be subjected to high load in the respective mode of function, especially to an extent of nearly 100% from a spatial point of view with regard to the high pressure treatment volume available, and especially also to an extent of 100% with regard to time. Pressurization or depressurization phases are not required. By comparison with a discontinuous process, only a fraction of the change of load is required. Economic advantages ultimately also arise, especially due to high throughput of bulk material.

In one embodiment, the continuous high pressure treatment comprises fluidizing of the bulk material, especially by means of a fluidized bed (active generation or control of the transition from a solid bed to a fluid bed). The fluidized bed is especially generated exclusively by means of extraction medium. Advantageously, the bulk material is introduced into a fluidized bed in which just one high pressure treatment plane is provided for the fluid bed (especially configured as a displaceable or swivelable valve level or as a rotatable or rotating plate level), especially at a lower end of the pressure vessel apparatus. The fluid bed may be isolated on either side by one of multiple high pressure treatment planes. The corresponding treatment plane may be isolated or closed before withdrawal of the bulk material (bulk material is collected). The fluidized bed may also be formed in multiple treatment planes, especially in multiple planes one on top of another (fluidized bed in a further sense). The fluidized bed enables achievement of advantageous mass transfer properties in combination with unlimited expansion opportunity for the bulk materials being treated. For example, in the case of polystyrene (PS) pellets, controlled surface treatment is also possible.

On completion of high pressure treatment, the gas flow is preferably reduced (reduced throughput), and the bulk material can be collected at the (respective) treatment plane.

The high pressure treatment volume may be provided here as a single volume for the entire high pressure process, i.e. for the entire high pressure treatment stage V2. In other words: it is not necessary to provide a multitude of high pressure stages.

In one working example, the high pressure treatment step sequence V2 is performed exclusively at one (single) high pressure level. This results not least in time advantages. Fluctuations in pressure need not be built up or dissipated. The process becomes slimmer, and not least also becomes less costly and more energy-efficient. Because it is possible to maintain the one (single) high pressure level, the continuous process also becomes more exact since, without the requirement for fluctuations in pressure, it is especially possible to use the dwell time to adjust the effect of the high pressure treatment of the bulk material in a very exact manner, especially depending on a single predefined/predefinable pressure level.

In one working example, during the high pressure treatment, individual batches of bulk material generated in the first step sequence are supplied to the high pressure treatment volume, wherein the batches form a charge under continuous high pressure treatment. As a result, the individual step sequences can not least also be decoupled from one another in an advantageous manner in terms of process technology. The first step sequence may, for example, be optimized with regard to size of the batch and with regard to pressure levels without having to alter or adjust the second step sequence as a result. The second step sequence, apart from the supply of bulk material, may also remain decoupled from the first step sequence and be individually controlled and optimized with regard to continuous or discontinuous material flow in the high pressure treatment volume. The present invention accordingly also enables a considerable simplification in the optimizing of process parameters of the second step sequence.

The supply of batches may, in one variant, also be effected directly at the target high pressure level. The pressure level in an inlet fitting may optionally also be lower than the high pressure level, especially also in the case of gravitational force-driven supply of bulk material. Preferably, the pressure provided on the outlet side of the first step sequence is at least as high as the high pressure level. This can especially also promote material flow.

In one working example, during the high pressure treatment, individual batches are discharged from the high pressure treatment volume. In this way, it is also possible to optimize the material flow in the high pressure treatment volume. Especially in the case of sensitive bulk material, which must not be significantly mechanically compressed for example, working in batches, especially in individual high pressure treatment planes, may be advantageous.

Advantageous configurations are elucidated hereinafter with regard to matching of all three step sequences V1, V2 and V3 in terms of control technology.

In one working example, in the first step sequence of pressurization, the bulk material flow rate which is adjustable batch/chargewise, especially the size of the respective batch/charge and/or a time cycle of the batch/charge, is controlled as a function of the bulk material throughput (absolute material flow) envisaged in the high pressure treatment step sequence or of the high pressure level. By matching in terms of process technology in the first step sequence via an adjustment of batch/charge sizes or cycling operations to the demands or process parameters of the second step sequence, the adjustment of process parameters in the second step sequence can remain as flexible as possible. According to the invention, therefore, there is great potential for optimization and a great variety of variants for the second step sequence, which broadens the spectrum of use of the high pressure treatment.

In one working example, in the third step sequence of depressurization, the chargewise bulk material flow rate, especially the size of the respective batch/charge and/or a time cycle of the batches/charges, is controlled as a function of the bulk material flow or of the high pressure level in the high pressure treatment step sequence. This too enables optimization of the second step sequence with regard to material flow, and optimization with maximum focus with regard to the high pressure treatment as such.

In one working example, a/the respective bulk material batch provided by the first step sequence of pressurization is smaller in terms of volume or in terms of mass than the charge under continuous high pressure treatment, i.e. smaller than the amount of bulk material treated or displaced in the high pressure treatment, especially smaller by a factor of 3 to 1000. This also results in great flexibility in terms of process technology. The factor may, for example, also be 10 or 100, according to the application, and according to the type of bulk material.

In one working example, in the continuous high pressure treatment, by controlling a rate of displacement of the bulk material which is constant in particular (preferably constant movement, continuous material flow) or by controlling cycling of discontinuous displacement of high pressure-treated batches between individual high pressure treatment planes, the dwell time or high pressure treatment time for the bulk material is established in the high pressure treatment volume. This can establish or optimize the desired effects of the high pressure treatment in a comparatively exact manner in spite of continuity of the process.

In one working example, in the continuous high pressure treatment, the bulk material flow is controlled by displacing the bulk material, depending on the size and/or cycling over time of batches supplied, continuously or in individual discontinuous batches in the high pressure treatment volume. This provides flexibility and a variety of variants with regard to material flow during high pressure treatment as well, such that a broad spectrum of use can be developed for various bulk materials.

The invention is also based on the concept of spatial separation or separability of the individual step sequences from one another. The decoupling of the material flow in the first and third step sequences, each from the material flow in the second step sequence, can optionally result in spatial decoupling. This has not only spatial advantages but also gives high degrees of freedom in the design of the process, especially in the choice of the most advantageous plant components for the high pressure treatment.

Advantageous configurations with regard to the step sequence of high pressure treatment V2 are elucidated hereinafter.

In one working example, the bulk material for the high pressure treatment V2 is disposed in at least one predefined first high pressure treatment plane and, proceeding from this first high pressure treatment plane, is displaced continuously or between further high pressure treatment planes (i.e. from high pressure treatment plane to high pressure treatment plane) within the high pressure treatment volume during the high pressure treatment V2. In this way, it is especially also possible to treat sensitive bulk material in an efficient manner. Arrangement in individual planes can also give advantages with regard to maximum homogeneity of flow of high pressure medium through the material.

In one working example, the continuous high pressure treatment comprises continuous displacement of the bulk material in a predefined material flow direction in the high pressure treatment volume, especially in a horizontal or vertical direction or in a direction inclined obliquely upward. In this way, it is also possible to match material flow direction and flow direction of high pressure medium.

In one working example, by continuous displacement of the bulk material (bulk material constantly in motion) or by discontinuous displacement between individual high pressure treatment planes in the high pressure treatment, a dwell time of the bulk material in the high pressure treatment volume is established, especially by adjustment of a speed of rotation of rotational actuators or by cycling of translational actuators or else in a gravitational force-driven manner. In this way, it is possible to influence the effects of the high pressure treatment in an exact manner, especially in a locally independent manner and independently of the first and third step sequences in terms of process technology.

In one working example, the continuous high pressure treatment comprises continuous displacement of the bulk material in two different predefined material flow directions in the high pressure treatment volume Vi, especially in two opposite material flow directions. This can also achieve advantageous configurations for the displacement of the bulk material in the high pressure treatment volume. In addition, the material can optionally be introduced and discharged at the same end of the pressure vessel apparatus, for example at the base.

In one working example, the continuous high pressure treatment comprises continuous displacement of the bulk material counter to gravity (or gravitational force) by supply of potential energy to the bulk material. In this way, it is especially also possible to optimize the discharge of bulk material from the high pressure treatment volume.

Elucidated hereinafter are advantageous configurations with regard to the manner of displacement of bulk material in the step sequence of high pressure treatment V2.

In one working example, the continuous high pressure treatment comprise continuous displacement of the bulk material or discontinuous displacement between individual high pressure treatment planes, in each case by means of a rotation, especially by means of a rotation of at least one rotational actuator about an axis of rotation aligned in material flow direction. In one working example, the continuous high pressure treatment comprises batchwise displacement of the bulk material by a rotation, especially by cyclical rotation of at least one rotational actuator. In each case, this can achieve displacement of the bulk material in a technically simple and exact manner. The rotational actuating movement can be coupled into the high pressure treatment volume in an advantageous manner.

In one working example, the continuous high pressure treatment comprises continuous displacement of the bulk material or discontinuous displacement between individual high pressure treatment planes, in each case by translation of at least one translational actuator. This can especially also achieve decoupling of the material flow from gravity.

In one working example, the continuous high pressure treatment comprises an autonomously gravitational force-driven continuous displacement of the bulk material without rotational or translational actuators. This especially also gives a slim construction in terms of apparatus technology, wherein the material flow can be effected in an autonomous manner at least in sections.

In one working example, the continuous high pressure treatment comprises fluidizing of the bulk material, especially in at least one fluidized bed, especially in an outlet region of the pressure vessel apparatus. This can especially also ensure efficient mass transfer, i.e. an efficient high pressure treatment. The at least one fluidized bed is especially produced exclusively by means of extraction medium.

If the high pressure treatment volume is defined by a single coherent compartment or has just one high pressure treatment plane, the fluidized bed can be generated throughout the compartment (fluidized bed in the conventional, narrower sense). If the high pressure treatment volume is defined by a multitude of compartments and/or has a multitude of high pressure treatment planes, the fluidized bed may also be established by turbulent flow characteristics and associated turbulent fluidization in the respective compartment or in the respective high pressure treatment plane (fluidized bed in the wider sense, in the form of a multitude of turbulent fluidized regions).

In one working example, the continuous high pressure treatment comprises discontinuous displacement of the bulk material in individually displaced/displaceable batches, each between predefined high pressure treatment planes, especially between high pressure treatment planes each defined by at least one gas-permeable plate or gas-permeable partition which is horizontal or inclined relative to the horizontal. In this way, it is especially also possible to optimize the material flow and mass transfer, especially also in the case of bulk material or granules that may be compressed only to a minimum degree or may be subjected to only a minor degree of mechanical or abrasive stress.

A plate may be understood to mean any type of element which is permeable or impermeable to fluids, which enables at least partial removal in the high pressure treatment volume and is set up for definition of one of the high pressure treatment planes (at least in sections). The plate may be in a fixed or displaceable arrangement. The plate may especially also be set up for arrangement of a batch of the bulk material. The plate may optionally be in an inclined alignment and/or optionally in a swivelable arrangement and/or in a translationally or rotatably displaceable arrangement.

There follows an elucidation of advantageous configurations of the step sequence of pressurization V1.

In one working example, the first step sequence of pressurization is performed in a discontinuous manner and comprises at least one step from the following group: batchwise pressure generation, especially by means of a pump, and/or batchwise supply of bulk material to the step sequence of high pressure treatment by means of an inlet fitting that accommodates the respective batch. The inlet fitting may, for example, comprise a ram, a seated plug valve (valve in the narrower sense), a ballcock valve and/or a flap.

The principle of use of a ram is disclosed, for example, in published specification DE 42 16 295 A1.

In one working example, the step sequence of pressurization comprises batchwise supply of bulk material, wherein the batchwise supply is performed by means of an inlet fitting having at least one inlet unit, especially valve and/or lock (airlock, rotary feeder). In this way, it is possible in each case to decouple the material flow from high pressure treatment parameters in the second step sequence as well.

The batchwise supply of bulk material for pressurization and/or batchwise discharge of bulk material on completion of high pressure treatment here may also be performed at multiple gradated pressure levels, especially at a pressure level between ambient pressure and high pressure level, especially at at least 2 or 3 bar, especially at more than 6 or more than 10 bar. According to the application, the ambient pressure may also be elevated in relation to atmospheric pressure, especially in the range from 3 to 10 bar.

The conveying of bulk material discharged from the high pressure treatment volume may also be based on a pressure differential. A reduced pressure is not required. A reduced pressure may optionally be generated in the third step sequence for conveying of the bulk material downstream of the high pressure treatment step.

The material flow may also be pressure-driven at least in sections, i.e. result from a pressure differential (pressure conveying, especially based on high pressure already established in the first step sequence V1). Suction conveying may also be provided. In the case of suction conveying, the conveying unit is at the end of the conveying distance to be traversed; this arrangement is appropriate, for example, in the third step sequence. It is also possible to convey the high pressure-treated product/raffinate/bulk material onward by suction conveying from an ambient pressure vessel, downstream of the depressurization that has already been effected beforehand. In the third step sequence V3, it is optionally also possible to draw a vacuum (reduced pressure) in order to increase the pressure differential for the conveying.

The devices in the step sequence of pressurization and in the step sequence of depressurization are set up, each individually or in their entirety, to ensure a pressure differential of at least 40 bar (especially from ambient pressure or atmospheric pressure to the high pressure level).

Elucidated hereinafter are advantageous configurations of the step sequence of depressurization V3.

In one working example, the third step sequence of depressurization is performed in a discontinuous manner and comprises at least one step from the following group: batchwise depressurization, especially by means of a piston motor, and/or batchwise discharge of bulk material from the step sequence of high pressure treatment by means of an outlet fitting that accommodates the respective batch. The outlet fitting may comprise, for example, a ram, a seated plug valve, a ballcock valve and/or a flap.

In one working example, the step sequence of depressurization comprises batchwise discharge of bulk material, wherein the batchwise discharge is performed by means of an outlet fitting with at least one outlet unit, especially valve and/or lock (airlock, rotary feeder). In this way, it is possible in each case to decouple material flow as well from high pressure treatment parameters in the second step sequence.

In one working example, in the batchwise supply and/or discharge of bulk material in at least one of the step sequences of pressurization and depressurization, the amount of bulk material is detected, especially in a gravimetric manner, especially in relation to individual bulk material batches. This enables not just monitoring of the material flow but also facilitates open-loop or closed-loop control, especially with regard to batches (especially times, volumes).

In one working example, in the batchwise supply and/or discharge of bulk material in at least one of the step sequences of pressurization and depressurization, actuation of inlet and/or outlet fittings is effected especially as a function of gravimetric measurements of bulk material batches that are detected in real time. This promotes further optimization measures, especially with regard to material flow.

Elucidated hereinafter are advantageous configurations of the step sequence of high pressure treatment V2.

In one working example, the continuous high pressure treatment comprises at least one continuous extraction, especially extraction of solvents. This also enables process parameters optimized specifically for the process of extraction. This also gives synergies in terms of process technology, especially also with regard to the recovery or reuse of solvents.

In one working example, the continuous high pressure treatment comprises at least one continuous impregnation, especially the impregnation of polymers. This also enables process parameters optimized specifically for the process of impregnation. In this way, it is also possible to achieve synergistic effects in terms of process technology. The impregnation can also be conducted in combination with at least one extraction.

In one working example, the continuous high pressure treatment comprises both a continuous extraction and a continuous impregnation, especially extraction of monomers and impregnation with additives. This also broadens the spectrum of use of the invention.

In one working example, the high pressure treatment comprises at least one continuous extraction of solvent(s) and is performed above the critical temperature and above the critical pressure of the extraction medium (i.e. supercritically). This especially also gives a high method efficiency, especially since this can minimize surface forces, and the extraction becomes particularly effective, also with regard to a drying effect. It is thus also possible to achieve a particularly high continuous throughput. Starting materials subjected to an extraction may be either liquids (fluids in the liquid phase, especially also viscous fluids) or solids. Examples of bulk materials subjected to high pressure treatment include:
  granular material (especially polymer granules), aerogel bodies, pellets, powder, beans, particles and/or other free-flowing aggregates of a multitude of bodies.

In one working example, the continuous high pressure treatment comprises flow of high pressure medium through the bulk material, especially in countercurrent to a continuous or discontinuous displacement (or displacement direction/material flow direction) of the bulk material. In this way, it is also possible to achieve advantages with regard to mass transfer and homogeneity of the high pressure treatment.

In one working example, the continuous high pressure treatment is performed at constant high pressure or with fluctuations in pressure that are unavoidable for technical reasons (which are perceptible to a greater or lesser degree according to the application), especially at a high pressure in the range from 500 to 1000 bar. Such fluctuations in pressure that are systemic, for example, on account of control valves, pulsations, lock operations or temperature fluctuations, are, for example, in the range from 3 to 5 bar or within the maximum percentage range of the high pressure level that can be established. This continuously constant pressure level also enables high efficiency in terms of process technology. Active pressure control is optionally possible in the direction of the target high pressure level over and above a variation in pressure of 1 bar or 2 bar, especially if the fluctuations in pressure that are unavoidable for technical reasons are comparatively high. Within the scope of these variations for technical reasons, the high pressure level may be considered/defined as being constant according to the above definition.

In one working example, the pressure vessel apparatus comprises a pneumatic, hydraulic, electrical, electromagnetic and/or magnetic drive unit which is especially coupled to at least one treatment plane by means of an actuator. This simplifies the automation, and the type of drive can be chosen especially depending on the bulk material to be treated.

The aforementioned object is also achieved in accordance with the invention by a control device set up to execute an above-described method, wherein the control device is coupled to at least one sensor unit set up to detect a flow of bulk material or a mass or a difference in mass or a volume, which sensor unit can be arranged in the material flow pathway in the high pressure treatment volume, wherein the control device optionally also comprises at least one sensor unit set up to detect a distance and/or a force and/or a pressure. This gives rise to advantages mentioned above.

The control device or the sensor unit may be coupled to an actuator of the pressure vessel apparatus. The respective sensor unit may especially also be coupled to or integrated into an inlet or outlet fitting.

The aforementioned object is also achieved in accordance with the invention by a high pressure treatment arrangement set up for high pressure treatment of bulk material by extraction and/or impregnation at a high pressure level, especially high pressure in the range from 40 to 1000 bar, comprising:
  a pressurization device with pressure generation means, especially at least one pump, for a pressurization V1 as the first step sequence;
  a pressure vessel apparatus coupled to the pressurization device by a high pressure-tight connection and having a high pressure-resistant wall that surrounds a high pressure treatment volume for the high pressure treatment V2 as the second step sequence;
  a depressurization device coupled to the pressure vessel apparatus by a high pressure-tight connection for a depressurization V3 as the third step sequence;
  wherein the pressure vessel apparatus for the high pressure treatment can be/is in a fixed arrangement and is set up for a continuous high pressure treatment solely by means of the one (single) high pressure treatment volume which is in a fixed arrangement and is at the high pressure level. This results in advantages mentioned above. After the first step sequence V1, preferably at least the high pressure level is applied. An extraction circuit may be operated, for example, by means of a high pressure pump set up for provision of a pressure level at least at the high pressure level, especially likewise independently of the material flow in the high pressure treatment volume.

In one working example, the high pressure treatment arrangement is set up to supply individual bulk material batches to the high pressure treatment volume during the high pressure treatment and also set up to continuously or discontinuously displace the bulk material in the form of a single charge or in batches within the high pressure treatment volume during the high pressure treatment. This gives not least also high variability, according to the application.

In one working example, the high pressure treatment arrangement is set up to discharge individual batches from the high pressure treatment volume during the high pressure treatment. In this way, it is also possible to adjust or control the material flow in a flexible manner. In the high pressure treatment volume, it is possible here for at least one predefined first high pressure treatment plane or optionally also further high pressure treatment planes to be provided, each set up for arrangement of the bulk material (or one charge or multiple batches) in predefined length or height positions. The discharge can optionally be effected at a central outlet, but optionally also at multiple non-central outlets, especially also specifically according to the high pressure treatment plane.

In other words: the pressure vessel apparatus is set up especially for the continuous high pressure treatment at the high pressure level in that the high pressure treatment arrangement has an inlet fitting coupled to the high pressure treatment volume in a high pressure-tight connection and an outlet fitting, each for the bulk material, which can be actuated discontinuously for provision of individual bulk material charges and each of which can be controlled individually at least with regard to the bulk material flow, in such a way that the high pressure treatment can be performed in a continuous manner at the high pressure level in the high pressure treatment volume Vi.

In one working example, the pressure vessel apparatus has at least one high pressure treatment plane which is in a fixed arrangement or can be arranged in a movable or displaceable manner within the high pressure treatment volume Vi and can be loaded with bulk material with the pressure vessel apparatus closed, and which can be unloaded in the course of high pressure treatment or after the high pressure treatment with the pressure vessel apparatus closed, in such a way that the high pressure treatment can be performed in a continuous manner. For this purpose, the respective high pressure treatment plane may, for example, be in an inclined alignment. It is optionally possible for the respective high pressure treatment plane to be aligned and movable at least approximately orthogonally to the direction of gravity and/or to be adjustable in terms of its cross-sectional profile. In this way, it is possible to control material flow.

In one working example, the inlet fitting for the batchwise supply of the bulk material to the second step sequence V2 (high pressure treatment) can be actuated in an automated manner, wherein a transfer cavity can be provided especially by means of a piston or a (rotary) feeder. The same applies to the outlet fitting and the batchwise discharge of the bulk material from the step sequence of high pressure treatment. This in each case also simplifies control of the material flow, especially in each case also based on measurement data from gravimetric and/or volumetric sensors, and/or based on cycling over time.

In one working example, the pressure vessel apparatus defines an at least approximately vertically aligned material flow direction. This also enables advantages by exploitation of gravity; the discharge of the bulk material can also be simplified thereby.

In one working example, the pressure vessel apparatus defines a material flow direction inclined relative to the vertical or horizontal, especially at an angle of 10 to 30°. This can also achieve advantages with regard to mass transfer and/or with regard to mixing of the bed.

In one working example, the pressure vessel apparatus defines an at least approximately horizontally aligned material flow direction. This also makes possible, for example, the use of nonreturn valves as barriers, especially between individual compartments of the high pressure treatment volume.

In one working example, at least one of the high pressure treatment planes is defined by at least one gas-permeable plate which is horizontal (or orthogonal to the direction of gravity) or inclined relative to the horizontal, or by a gas-permeable partition in a corresponding arrangement. The inclined arrangement also enables autonomous gravitational force-driven bulk material displacement within the high pressure treatment volume. In the case of an inclined arrangement of the plate, the plate preferably extends only over about ¾ of the diameter of the pressure vessel apparatus. In the case of an inclined arrangement of multiple plates, the plates may be in an offset cascade-like arrangement relative to one another. This configuration is also advantageous with regard to changes in volume in the bulk material.

A horizontal arrangement may also be understood to mean an arrangement at least approximately orthogonal to the longitudinal extent of the pressure vessel apparatus.

In one working example, the pressure vessel apparatus has at least one actuator set up to actuate at least one high pressure treatment plane of the pressure vessel apparatus, especially a rotationally displaceable actuator or a translationally displaceable actuator, especially at least one actuator coupled into the high pressure treatment volume in a high pressure-tight manner with respect to the environment. In this way, it is especially also possible to individually displace batches within the high pressure treatment volume.

The respective actuator may be guided into the pressure vessel apparatus at at least one feedthrough, for example by means of a gland or a magnetic coupling. It is optionally possible, for actuation of the respective actuator, also to provide a motor (fluid motor, electric motor), optionally also within the pressure vessel apparatus.

In one working example, the inlet fitting comprises at least one inlet unit, especially a valve and/or a (rotary) feeder. The inlet fitting may optionally also have multiple or different inlet units, especially with a size-variable transfer cavity.

The aforementioned object is also achieved in accordance with the invention by use of a pressure vessel apparatus for continuous high pressure treatment of bulk material by extraction and/or impregnation in a closed system isolated from the environment U in a high pressure-tight manner, wherein the high pressure treatment V2 is performed and individually controlled as a step sequence between a pressurization V1 and a depressurization V3, wherein the bulk material is displaced continuously in a high pressure treatment volume in a fixed arrangement in the pressure vessel apparatus or is displaced at predefinable/predefined times in batches between individual high pressure treatment planes, especially use of the pressure vessel apparatus in an above-described method, especially use of the pressure vessel apparatus in an above-described high pressure treatment arrangement, especially under high pressure at pressures above 40 to 1000 bar. This gives rise to numerous aforementioned advantages.

The aforementioned object is also achieved in accordance with the invention by use of a pressure vessel apparatus for continuous high pressure treatment of bulk material configured as polymers, by extraction and optionally also by impregnation, for supercritical drying for provision of the polymers as superinsulators, wherein the high pressure treatment V2 is performed as a step sequence between a pressurization V1 and a depressurization V3, wherein the bulk material is treated at the high pressure level in a continuous manner in a high pressure treatment volume in a fixed arrangement, especially use of the pressure vessel apparatus in an above-described method, especially use of the pressure vessel apparatus in an above-described high pressure treatment arrangement, especially under high pressure at pressures above 40 to 1000 bar. This gives rise to numerous aforementioned advantages.

The aforementioned object is also achieved in accordance with the invention by use of a pressure vessel apparatus for continuous high pressure treatment of bulk material configured as aerogels, by extraction and/or by impregnation, wherein the continuous high pressure treatment V2 is performed as a step sequence between a pressurization V1 and a depressurization V3, wherein the bulk material is treated at the high pressure level in a continuous manner in a high pressure treatment volume Vi in a fixed arrangement, especially use of the pressure vessel apparatus in an above-described method, especially use of the pressure vessel apparatus in an above-described high pressure treatment arrangement, especially under high pressures at pressures above 40 to 1000 bar. This results in numerous aforementioned advantages. In particular, material flow can also be optimized with regard to large changes/increases in volume in the region of a factor of 10.

FIG. 1 shows a high pressure treatment arrangement 100. For a first step sequence V1, individual variants of a pressurization device 10, 10a, 10b, 10c, 10d, 10e, 10f are shown. The pressure generation means 11 used may especially be a pump or a piston. An inlet fitting 12 may have one or more inlet units 12.1, especially a valve and/or a (rotary) feeder. A rotary feeder especially also gives the advantage that onward passage of gas is made more difficult.

For the second step sequence, one or more pressure vessel apparatuses according to the variants 20, 20a, 20b, 20c, 20d, 20e, 20f, 20g, 20h, 20j, 20k, 201 may be used.

Additionally shown, for a third step sequence V3, are individual variants of a depressurization device 30, 30a, 30b, 30c, 30d. It is possible here for multiple depressurization units 31, 31a, 31b to be provided, which are coupled to a/the second step sequence V2 via one central or multiple non-central inlet fittings 32. A piston or piston motor 33 may be connected via at least one depressurization unit to an outlet fitting 35 for final discharge of the bulk material.

A control device 101 indicated by way of example for variant 20c is connected to or comprises a logic unit 103. The control device 101 may, for example, also be coupled to sensor units and/or to actuators. The control device may also comprise the logic unit and be set up to control the method steps described in detail here.

The arrangement in columns for the individual apparatuses 10, 20, 30 of the respective step sequence V1, V2, V3 illustrates that the respective variants can be combined with one another. The individual variants for the second step sequence V2 are shown in FIGS. 1 and 2 to 4.

FIGS. 2A, 2B, 2C, 2D, 2E, 2F, 2G, 2H, 2J, 2K, 2L show, in detail, the use and arrangement of individual treatment planes 5 in the fixed volume Vi, wherein optionally also rotational or translational actuators 28, 28a, 28b may be used.

For the purpose of better clarity, a general description is given in advance of the respective pressure vessel apparatus. The respective pressure vessel apparatus 20 has components from the following group:

cylindrical inner wall 21, inlet fitting 22, inlet unit 22.1, high pressure-resistant wall 23, heating device, especially heating shell 24, outlet fitting 25, outlet unit/outlet stub 25.1, in-/outflow fitting 26, in-/outflow fitting 27, actuator 28, rotational actuator 28a, translational actuator 28b.

FIG. 2A shows a working example (pressure vessel apparatus 20a) having planes 5 each in an inclined arrangement at an angle of inclination relative to the horizontal and relative to the vertical, each of which are defined by one plate. The bulk material may flow in a gravity-driven manner from one plane to the next. The planes are arranged opposite one another with opposing inclination and are alternately supported on opposite inner vessel surfaces. The free ends of the plates in the respective planes 5 are in an overlapping arrangement in radial direction, such that a meandering or serpentine material flow pathway can be imposed on the bulk material by means of simple measures.

FIG. 2A shows three different media streams: first media stream M1: bulk material; second media stream M2: high pressure medium or extraction medium, optionally comprising impregnation medium; third media stream M3: extract (especially discharged solvent stream). The first media stream M1 here may also comprise a feed of solvent present in/on the bulk material, but this does not correspond to any explicitly envisaged stream of matter or material flow pathway, but depends on the substances or constituents with which the bulk material is laden/contaminated. The media streams M2, M3 may be mono- or biphasic.

The example of FIG. 2A can be used to elucidate the material flow: bulk material 1 is supplied as a single batch 2.1. In the high pressure treatment volume, multiple bulk material batches 3.1, 3.2, 3.n form the bulk material charge 3 under high pressure treatment. The bulk material flow is propagated, for example, by multiple discharged batches 4.1. The continuity of the high pressure treatment may especially be ensured due to the high pressure treatment volume Vi kept at a high pressure level, especially in combination with autonomous gravitational force-driven material flow over the individual planes 5 or from plane to plane. The material flow is (ideally) continuous. The entire bed is (ideally) a coherent bed (a single charge; no batches) which is displaced over the planes down to the outlet at the base of the vessel.

FIG. 2B shows a working example (pressure vessel apparatus 20b) having a multitude of treatment planes 5 in/on which a delimiting plate is disposed in each case over a circumferential angle of especially about 300°, with a passage over a circumferential angle of especially about 60°. In the case of rotation, the passage can be positioned in a relative position and hence a gravitationally driven material flow (downward) can be opened up. The continuity of the high pressure treatment can especially be ensured due to the high pressure treatment volume Vi kept at a high pressure level, especially in combination with rotational actuating movements for gravitational force-driven batchwise displacement of batches by a plane downward in each case, each time in reaction to the rotational actuating movement.

In a first variant (FIG. 2B), it is possible here to turn a wheel having clear spaces between separation plates. The respective plate that includes the circular segment cutout (passage) over 60° and is otherwise fluid-permeable but retains the bulk material is/remains in a fixed arrangement in this variant.

In a further embodiment, the plates with the passages are mounted in a rotating manner, and the wheels or separation plates are provided as fixed internals.

The rotational actuating movement may optionally be defined centrally via a shaft or via the respective high pressure treatment plane.

The plate 29 shown in FIG. 2B may, in other working examples, also take the form of a continuous partition, or the plate may optionally be arranged in an inclined alignment, and/or optionally arranged so as to be swivelable and/or translationally displaceable. It is possible here to provide at least one sensor unit 105, especially for temperature, pressure, force, distance, mass and/or flow rate. The respective sensor unit 105 is especially disposed in one of the treatment planes 5.

FIG. 2C shows a working example (pressure vessel apparatus 20c) in which the bulk material flows from the bottom upward counter to gravity. A conveying screw conveys the bulk material on rotation up to a downpipe in essentially vertical alignment, through which the bulk material can be conveyed downward in a gravity-driven manner and discharged from the vessel. The continuity of the high pressure treatment can especially be ensured due to the high pressure treatment volume Vi kept at high pressure level, especially in combination with a single, especially homogeneous, rotational actuating movement (optionally constant speed of rotation) for displacement of the charges counter to gravity and for the gravity-driven discharge from the high pressure vessel.

FIG. 2D shows a working example (pressure vessel apparatus 20d) having a conveying screw having its longitudinal axis/axis of rotation in horizontal alignment. The conveying screw is provided throughout the high pressure treatment volume Vi with respect to the radial direction and corresponds geometrically to the inner shell surface of the wall 23.

The continuity of the high pressure treatment can especially be ensured due to the high pressure treatment volume Vi which is kept at a high pressure level, especially in combination with a single, especially homogeneous, rotational actuating movement (optionally constant speed of rotation) for displacement of the charges in at least approximately horizontal direction. In the case of this arrangement of the vessel, the charge may also be stored/displaced in an optimized manner with regard to pressure/pressurization and opportunities to expand. Even in the case of batchwise supply of material, the bed may take the form of a single coherent charge due to the conveying screw (as is also the case in the variant according to FIG. 2C, 2E).

FIG. 2E shows a variant (pressure vessel apparatus 20e) of the working example according to FIG. 2D, wherein the longitudinal axis is in an inclined arrangement at an angle of about 25 to 35° relative to the horizontal plane, and wherein the radial diameter of the conveying screw is less than the diameter of the high pressure treatment volume. A cylindrical insert 21 forms an annular gap together with the inner shell surface of the wall 23, through which solvent in particular can be removed. The cylindrical fluid-permeable inner wall 21 surrounds the rotational actuator 28a and divides the bulk material from an annular cavity. In the annular cavity between the inner wall 21 and the wall 23, fluids can advantageously be supplied or removed. The continuity of the high pressure treatment can especially be ensured due to the high pressure treatment volume Vi which is kept at a high pressure level, especially in combination with a single, especially homogeneous, rotational actuating movement (optionally constant speed of rotation) for displacement of the charges in a direction inclined relative to the horizontal plane. In the case of this arrangement of the vessel or of the axis of the conveying screw, the charge may also be handled in an optimized manner with regard to removal of solvent(s).

FIG. 2F, 2G each show a working example (pressure vessel apparatus 20f, 20g) with a comparatively narrow, elongated high pressure treatment volume Vi, especially provided by a pipelike high pressure vessel wall. The pistons inserted into the ends of the high pressure treatment volume serve, according to one variant, for pressure buildup and for pressure release, and can also be provided in combination with single-sidedly blocking internals of the nonreturn valve type or in combination with unidirectionally blocking flaps. The nonreturn valves are fluid-permeable (especially with barrier elements configured as a perforated plate/wire mesh). The internals may optionally also be provided as conveying units that are charged when high pressure has already been applied.

The respective optimal configuration of the flaps or shut-off units may depend on the application or the type of bulk material; for example, it is also possible to provide semi-circular foldable halves of plates. FIG. 2F describes a construction with a single cavity for the high pressure treatment volume (no subdivision, no isolation). FIG. 2G describes a multistage construction with multiple mutually delimited cavities within the high pressure treatment volume, the cavities being isolated from one another by the isolation units 29.

In the working example (pressure vessel apparatus 20h) shown in FIG. 2H, pressurization and depressurization units are external, i.e. not coupled to the high pressure treatment volume or to the pressure vessel but provided upstream and downstream thereof.

The continuity of the high pressure treatment according to FIGS. 2F, 2G, 2H may in each case especially be ensured by virtue of the high pressure treatment volume Vi kept at a high pressure level, especially in combination with the pressure-driven batchwise supply and discharge of batches of the bed.

FIG. 2J shows a working example (pressure vessel apparatus 20j) with plates 29 or flaps 29a in a paired arrangement. Both the plates 29 and the flaps 29a are blocking on one side; the plates 29 are in a fixed arrangement, and the flaps 29a are co-rotating, i.e. coupled to the translational actuator 28a, especially mounted thereon by a swivel joint. In principle, the working example shown in FIG. 2J can be described as a concept of a reciprocating piston pump or a beam pump. The flaps are each fluid-permeable (especially with barrier elements configured as a perforated plate/wire mesh).

Joints or bearings for the fixed plates 29 may especially be secured on the vessel wall; it is also possible for counter bearings or stops for the co-rotating flaps 29a to be secured thereon. It is also possible to provide fixed elements in the middle, especially in order to provide a plate articulated thereon. Both the plates 29 and the flaps 29a open in conveying direction (to the right in FIG. 2J). The continuity of the high pressure treatment may especially be ensured due to the high pressure treatment volume Vi kept at a high pressure level, especially in combination with successively repeated translational actuating movements back and forth between a translational zero position and a translational end position, wherein the translational movement in one direction (to the right in FIG. 2J) is a stroke movement for conveying of the material (actively initiated/actuated material flow by unidirectional translational actuating movement), and wherein the bed is displaced stepwise in batches on the individual planes or in the individual compartments defined by the plates in the high pressure treatment volume Vi. The kinematic mechanism used (28, 28b, 29, 29a) for the single-sidedly blocking mechanism can be described as a translational kinematic swivel mechanism.

FIG. 2K shows a top view of a working example (pressure vessel apparatus 20k), which enables material flow by means of local geometric variations of compartments or sections within the high pressure treatment volume Vi. Two pistons 29b are secured to the translational actuator 28b and hence displaced within the high pressure treatment volume Vi (in horizontal direction according to FIG. 2K). The pistons 29b act bidirectionally: in a first direction, the respective piston on the inlet side generates a negative pressure differential (negligible or at least not to be regarded as a pressure cycle compared to the high pressure level), such that bulk material is conveyed into the high pressure treatment volume Vi (flap or nonreturn valve 29 opens on the inlet side into the high pressure treatment volume Vi), and in a second opposite actuation direction the respective piston generates a positive pressure on the inlet side, such that bulk material is discharged from the high pressure treatment volume Vi (flap or nonreturn valve 29 closes on the inlet side to the high pressure treatment volume Vi). On the outlet side of the high pressure treatment volume Vi, the same movement of the piston 29a leads to an opposite effect. The piston here also isolates two compartments of the high pressure treatment volume Vi that are respectively connected to one another via a conduit section from one another. The flaps 29 in the arrangement in FIG. 2K are displaced in lateral direction (upward or downward according to FIG. 2K). The arrangement according to FIG. 2K can also be constructed in a multistage series construction. The continuity of the high pressure treatment can especially be ensured due to the high pressure treatment volume Vi kept at a high pressure level, especially in combination with successively repeated translational actuating movements back and forth between two translational end positions, wherein the translational movement is a bidirectional stroke movement for conveying of the material (bidirectionally translationally actuated material flow), and wherein the bed is displaced in batches in the individual sections or compartments within the high pressure treatment volume Vi.

FIG. 2L shows a working example (pressure vessel apparatus 20l) in which the material can flow independently of gravitational forces throughout the high pressure treatment volume Vi independently of flaps or valves, especially by means of a conveying device routed horizontally through the high pressure treatment volume Vi, especially a conveyor belt, which defines a high pressure treatment plane for arrangement of the bulk material. The continuity of the high pressure treatment can especially be ensured due to the high pressure treatment volume Vi kept at a high pressure level, especially in combination with a rotational actuating movement (rotary drive for conveyor belt), which is converted by means of the kinematic mechanism of the conveying device to a translational material flow movement of the entire bed. In this variant too, the material flow in the high pressure treatment volume Vi can be controlled independently of the feed or discharge of batches.

In the above-described working examples, temperature regulation for compliance with/control of a constant temperature level can optionally be effected. The internals within the high pressure treatment volume that are shown in FIGS. 2A to 2L may either be fixedly installed and constructed or be configured as at least one insert, especially for mounting on a lid of the pressure vessel apparatus.

FIG. 3A, 3B show, in accordance with FIG. 2F, two working examples in which the material flow on the inlet side and the outlet side of the high pressure treatment volume Vi is accomplished by means of a translational piston mechanism. According to FIG. 3A, the high pressure treatment volume here may be provided, for example, by a cylindrical or tubular pressure vessel apparatus. FIG. 3B shows a working example with the pressure vessel configured as a conduit with two valves 29, through each of which the flow can pass to the right. The first nonreturn valve 29 (arranged on the left) includes a nonreturn function, and the second valve 29 (arranged on the right) lacks a nonreturn function. The material flow is caused by means of two pistons or piston motors 33, with the pistons acting bidirectionally, in a pressure-reducing manner on the one hand (pressure drop) and in a pressurizing/pressure-increasing manner on the other (pressure buildup). The second valve is connected to the piston motor 33 via a closed-loop control loop (dotted line). The continuity of the high pressure treatment may especially be ensured in the manner described in connection with FIGS. 2F, 2G, 2H.

FIGS. 4A, 4B, 4C, 4D show working examples that are similar to the working example of FIG. 2F. A first nonreturn valve 29 arranged on the inlet side opens to the right in material flow direction and blocks to the left, and a second nonreturn valve 29 disposed on the outlet side opens to the left counter to the material flow direction and blocks to the right. The high pressure vessel 20 in tubular configuration in terms of its geometry has an outlet at the bottom end, especially for solvents. The continuity of the high pressure treatment can especially be ensured in the manner described in connection with FIGS. 2F, 2G, 2H.

Figure 4A:
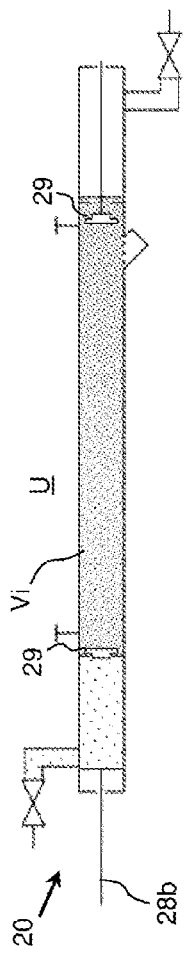
FIGS. 4A-4D are cross-sectional side views of still further example apparatuses set up for the second step sequence.
Figure 4B:
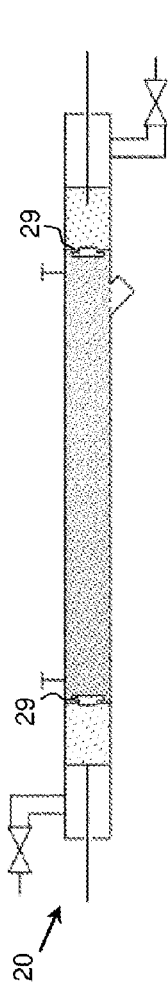
Figure 4C:
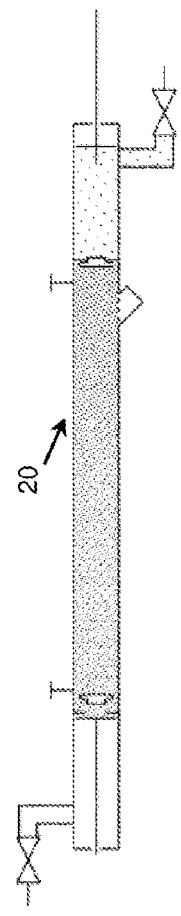

FIGS. 4A to 4C show the same working example. FIG. 4A shows a state of operation in which bulk material is discharged from the high pressure treatment volume (first nonreturn valve 29 on the left in closed position; second nonreturn valve 29 on the right in open position).

FIG. 4B shows a state of operation in which the high pressure treatment volume is isolated on both sides (first and second nonreturn valves in the closed position). In the high pressure treatment volume Vi isolated from the environment U, for example, extraction of solvent(s) is effected.

FIG. 4C shows a state of operation in which bulk material is introduced into the high pressure treatment volume (first nonreturn valve 29 on the left in open position as soon as the pressure is balanced or as soon as a slightly elevated pressure is applied; second nonreturn valve 29 on the right in closed position).

Figure 4D:
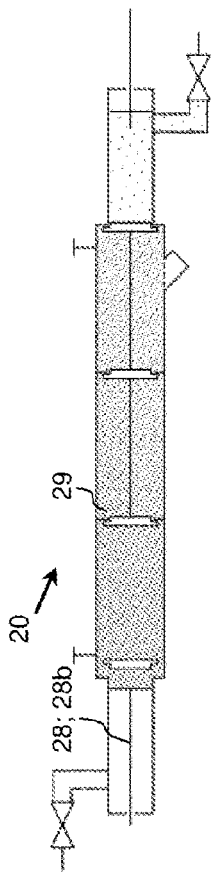

In the working example shown in FIG. 4D, a multitude of compartments (here: three compartments) is provided in the high pressure treatment volume Vi, which are each arranged in series with respect to one another and are isolated by means of nonreturn valves 29 that open on one side; these nonreturn valves may be coupled to one another, especially by means of a piston rod, such that all nonreturn valves 29 on the outlet side are actuatable together by means of a translational actuating movement. The multitude of compartments promotes very exact control or regulation by the manner in which the bed flows through and via the dwell time (contact time). It is optionally possible, for example, also for only two or four or even more compartments/stages to be provided.

In FIGS. 4A, 4B, 4C, 4D, the hatching density schematically illustrates the magnitude of the high pressure level.

Figure 5:
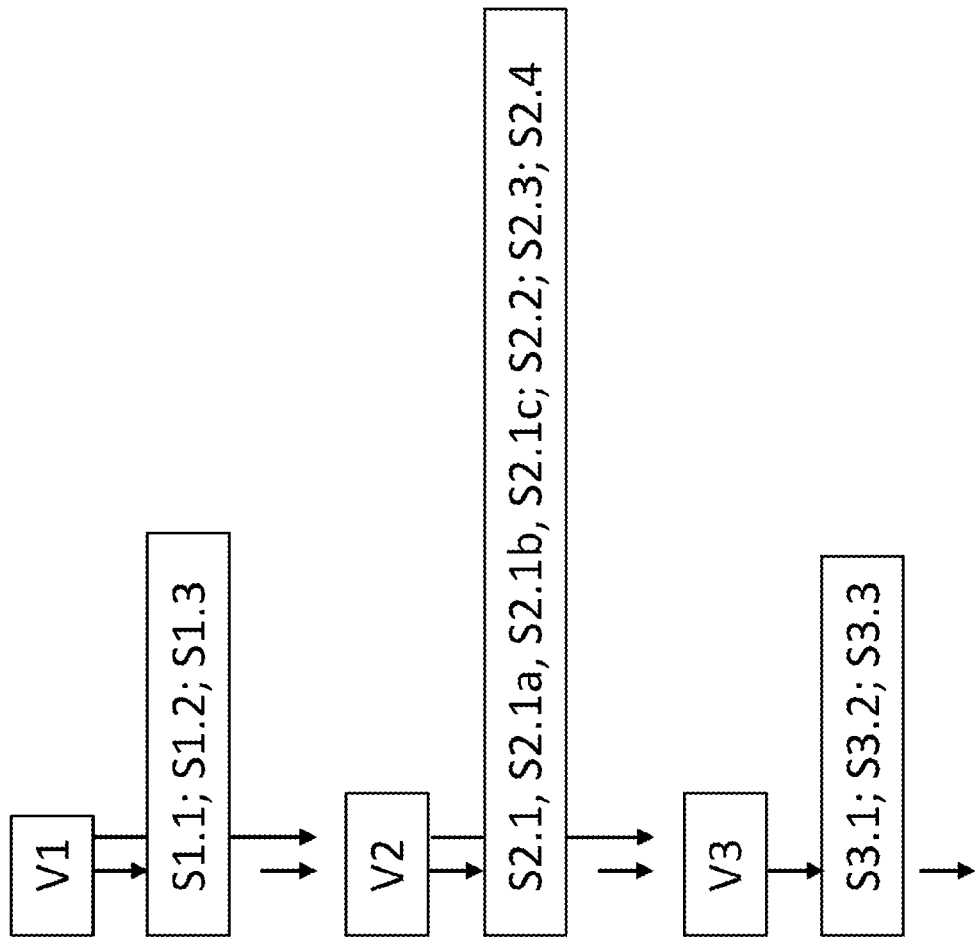
FIG. 5 is a schematic diagram of individual steps of an example method.

FIG. 5 illustrates individual steps of a method of the invention, especially in illustrative method sequence. A first step sequence V1 (pressurization) especially comprises three mutually delimitable or individually controllable steps:

S1.1 feeding of bulk material as a batch/charge to a pressurization volume

S1.2 building up the pressure in the pressurization volume, and maintaining the pressure S1.3 conveying the bulk material into the high pressure treatment volume A second step sequence V2 (continuous high pressure treatment) especially comprises the following steps:

S2.1 displacing the bulk material in the high pressure treatment volume

S2.2 high pressure treatment by extraction

S2.3 high pressure treatment by impregnation

S2.4 discharging bulk material from the high pressure treatment volume

The displacement S2.1 may optionally comprise one of the following steps:

S2.1a batchwise conveying of the bulk material in the high pressure volume

S2.1b continuous conveying of the bulk material in the high pressure volume

S2.1c disposing batches of the bulk material on one plane each

A third step sequence V3 (depressurization) especially comprises the following steps:

S3.1 feeding of bulk material as a batch/charge into a depressurization volume

S3.2 reducing the pressure in the depressurization volume

S3.3 discharging bulk material from the depressurization volume

FIGS. 6A, 6B, 6C, 6D, 6E, 6F show individual variants for steps of the first step sequence V1. FIG. 6A shows a piston 33, optionally configured as a pressure buildup unit (especially pump) and/or as a conveying unit. It is possible to use further pump designs.

FIG. 6B shows a multitude of pistons 33 collectively coupled to a conduit that leads to the second step sequence V2.

FIG. 6C shows a conveying screw with a rotational actuator for provision of a continuous material flow to the second step sequence V2.

FIG. 6D shows a multitude of conveying screws, each with a rotational actuator, collectively coupled to a conduit that leads to the second step sequence V2.

FIG. 6E shows a construction with a single pressurization unit 11a.

FIG. 6F illustrates a variant by means of which advantages can be ensured with regard to simplified implementation of continuity of the process. By virtue of single or multiple redundancy of the pressurization units 11a, 11b, the pressure can be built up in parallel with a time delay.

In a comparable manner to the first step sequence V1, this concept can also be employed for the third step sequences V3, i.e. for the arrangement and connection of depressurization units 31a, 31b. The depressurization can also be effected in parallel with a time delay. First of all, the bulk material is discharged from the high pressure volume into individual depressurization units 31 and, after depressurization, the substreams are combined again to form a single material stream. The supply to the individual depressurization units 31 can be controlled individually in each case.

Figure 7C:
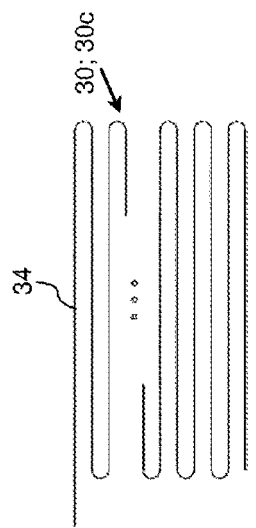
FIGS. 7A-7D are cross-sectional side views of further example apparatuses set up for the third step sequence.
Figure 7D:
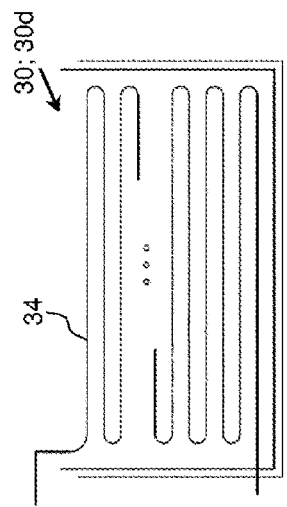
Figure 7A:
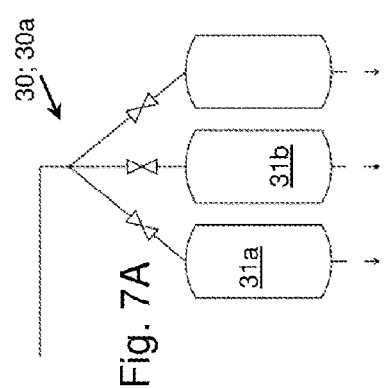

FIGS. 7A, 7B, 7C, 7D show individual variants for the third step sequence V3. FIG. 7A shows a variant of the working example according to FIG. 6F. The bulk material is discharged from the high pressure volume into the redundant depressurization units 31, 31a, 31b, especially alternately or in sequence, and, after depressurization, each substream is conducted onward individually. The depressurization units 31 may be arranged not just in parallel to one another but also at least partly in series. Due to redundancy, at least one depressurization unit 31 can be made available at any time in the process.

Figure 7B:
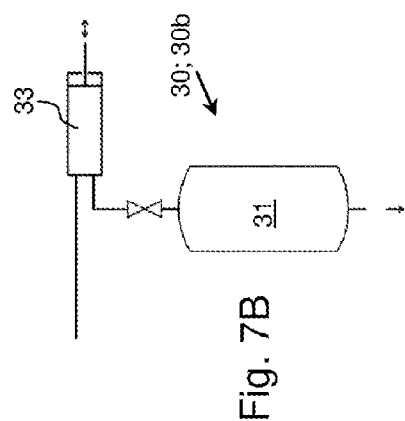

FIG. 7B shows a working example with a piston/piston motor 33 and a depressurization unit 31 coupled thereto, wherein the piston motor 33 is used as a unit for control of a material flow established in volumetric terms, in that the piston is driven by means of positive pressure. The piston motor is especially set up to adjust the material throughput.

The piston motor here also enables the recovery of energy from mechanical work.

FIG. 7C, 7D each illustrate a further working example in which the assumption can be made that the bulk material can be conveyed solely on the basis of a pressure gradient that develops over a comparatively long (depressurization) conduit 34, with simultaneous provision of depressurization over the corresponding length. The material flow pathway created over a predefined length is set up to fulfil the function of a throttle. It has been found that, for the pressure buildup, it is optionally possible to use a single coherent long conduit (tube) 34, in which case the pressure differential established over a predefinable unit of length in the tube is utilized as driving force for the material flow, especially exclusively, i.e. independently of any further conveying devices. It is optionally possible for at least one control unit to be provided along the material flow pathway.

FIG. 7D shows a variant with temperature control, especially in order to be able to compensate for any cooling in the course of depressurization by supply of thermal energy (heating) along the conduit 34. The conduit 34 may be disposed, in sections or completely, in a heated bath or in a heat supply unit isolated from the environment. The process illustrated as a continuous depressurization and transport process in FIGS. 7C, 7D may also be referred to synonymously as a multitude of minimally small depressurization steps.

LIST OF REFERENCE NUMERALS 1 bulk material or (bed of) granules
2.1 batch supplied
3 bulk material charge under high pressure treatment
3.1, 3.2, 3.n bulk material batch under high pressure treatment
4.1 batch discharged
5 high pressure treatment plane
10,10a, 10b, 10c, 10d, 10e, 10f pressurization device
11a, 11b pressurization unit
11 pressure generation means, especially pump or piston
12 inlet fitting
12.1 inlet unit, especially valve and/or lock
20,20a,20b,20c,20d,20e,20f,20g,20h,20j,20k,20l pressure vessel apparatus
21 cylindrical inner wall
22 inlet fitting
22.1 inlet unit, especially inlet stub
23 high pressure-resistant wall
24 heating device, especially heating shell
25 outlet fitting
25.1 outlet unit, especially outlet stub
26 in-/outflow fitting, especially stub
27 in-/outflow fitting, especially stub
28 actuator
28a rotational actuator 28b translational actuator
29 plate, partition, flap, unit, in each case at least partly isolating, optionally in inclined configuration, swivelable and/or displaceable
29a co-rotating flap
29b piston
30,30a,30b,30c,30d depressurization device
31, 31a, 31b depressurization unit
32 inlet fitting
33 piston or piston motor or piston pump
34 depressurization conduit
35 outlet fitting
100 high pressure treatment arrangement
101 control device
103 logic unit
105 sensor unit, especially for temperature, pressure, force, distance, mass and/or flow rate
M1 first media stream: bulk material
M2 second media stream: high pressure medium or extraction medium, optionally comprising impregnation medium
M3 third media stream: solvent
V1 first step sequence: pressurization
S1.1 supply of bulk material as a batch/charge to a pressurization volume
S1.2 buildup of pressure in the pressurization volume, and maintaining of the pressure
S1.3 conveying the bulk material into the high pressure treatment volume
V2 second step sequence: continuous high pressure treatment comprising extraction and/or impregnation
S2.1 displacement of the bulk material in the high pressure treatment volume
S2.1a batchwise conveying of the bulk material in the high pressure volume
S2.1b continuous conveying of the bulk material in the high pressure volume
S2.1c arrangement of batches of the bulk material on one plane each
S2.2 high pressure treatment by extraction
S2.3 high pressure treatment by impregnation
S2.4 discharge of bulk material from the high pressure treatment volume
V3 third step sequence: depressurization
S3.1 supply of bulk material as a batch/charge to a depressurization volume
S3.2 pressure buildup in the depressurization volume
S3.3 discharge of bulk material from the depressurization volume
U environment
Vi high pressure treatment volume, or cavity for high pressure treatment sealed in a high pressure-tight manner
V1 first step sequence
V2 second step sequence
V3 third step sequence

What is claimed is:

1. A method for high pressure treatment of bulk material by extraction, wherein the bulk material is disposed in a high pressure treatment volume, which has cavities, of a pressure vessel apparatus and is treated at a high pressure level in a range from 40 to 1000 bar, wherein the method comprises:
pressurizing the high pressure treatment volume;
high pressure treating the bulk material in a continuous manner in the high pressure treatment volume, with continuity of the high pressure treating being ensured solely by way of the high pressure treatment volume, wherein the high pressure treatment volume or the pressure vessel apparatus is in a fixed arrangement during the high pressure treating, wherein the high pressure treating comprises continuously displacing the bulk material by translation of a translational actuator within the high pressure treatment volume; and
depressurizing the high pressure treatment volume.

2. The method of claim 1 wherein the translational actuator is a piston inserted into an end face of the high pressure treatment volume, wherein the piston performs a unidirectional translational actuating movement within the high pressure treatment volume back and forth between a translational zero position and a translational end position.

3. The method of claim 1 wherein plates and flaps in a paired arrangement within the pressure vessel apparatus block one side, wherein the flaps are connected to the translational actuator such that the flaps move with the translational actuator.

4. The method of claim 1 wherein two pistons secured to the translational actuator are moved bidirectionally within the high pressure treatment volume, wherein each piston generates a negative pressure differential in a first direction such that the bulk material is conveyed into the high pressure treatment volume and generates a positive pressure in a second direction, which is opposite the first direction, such that the bulk material is discharged from the high pressure treatment volume.

5. The method of claim 1 wherein during the high pressure treating individual bulk material batches generated during the pressurizing are supplied to the high pressure treatment volume, wherein the individual bulk material batches form a charge under continuous high pressure treatment, wherein during the high pressure treating the individual bulk material batches are discharged from the high pressure treatment volume.

6. The method of claim 5 wherein a respective bulk material batch provided by the high pressure treating is smaller in terms of volume or in terms of mass than the charge under continuous high pressure treatment.

7. The method of claim 1 wherein the translational actuator is one of a plurality of translational actuators, wherein in the high pressure treating continuous displacement of the bulk material between individual high pressure planes establishes a dwell time of the bulk material in the high pressure treatment volume by cycling of the translational actuators.

8. The method of claim 1 wherein the pressurizing is performed in a discontinuous manner and comprises at least one of:
batchwise generation of pressure with a pump; or
batchwise supply of the bulk material to the high pressure treatment with an inlet fitting that accommodates a respective batch and comprises a ram, a seated plug valve, a ballcock valve, and/or a flap.

9. The method of claim 1 wherein the depressurizing is performed in a discontinuous manner and comprises at least one of:
batchwise depressurization with a piston motor; or
batchwise discharge of the bulk material from the high pressure treating step with an outlet fitting that accommodates a respective batch and comprises a ram, a seated plug valve, a ballcock valve, and/or a flap.

10. The method of claim 1 wherein the high pressure treating comprises continuous extraction of solvent, which is performed above a critical temperature and above a critical pressure of an extraction medium.

11. The method of claim 1 wherein the high pressure treating comprises continuous extraction of monomers.

12. A high pressure treatment system configured for high pressure treatment of bulk material by extraction at a high pressure level in a range from 40 to 1000 bar, the high pressure treatment system comprising:
- a pressurization device having pressure generation means;
- a pressure vessel apparatus coupled to the pressurization device and including a high pressure-resistant wall surrounding a high pressure treatment volume, wherein the pressure vessel apparatus is configurable in a fixed arrangement and is configured for a continuous high pressure treatment solely by way of the high pressure treatment volume that is in a fixed arrangement and is at the high pressure level, wherein the high pressure treatment volume includes cavities that are delimited and isolated from one another by partition units, wherein a translational actuator is disposed in the high pressure treatment volume for performing a translational actuating movement; and
- a depressurization device coupled to the pressure vessel apparatus.

13. The high pressure treatment system of claim 12 configured for:
- supplying individual bulk material batches to the high pressure treatment volume during the high pressure treatment;
- continuous displacement of the bulk material as a single charge or in batches in the high pressure treatment volume during the high pressure treatment; and
- discharging individual batches from the high pressure treatment volume during the high pressure treatment.

14. The high pressure treatment system of claim 12 wherein the translational actuator is a first translational actuator, wherein the first translational actuator and a second translational actuator are configured as pistons that are inserted into an end face of the high pressure treatment volume.

15. The high pressure treatment system of claim 12 wherein the partition units are configured as single-sidedly blocking plates and single-sidedly blocking flaps arranged in pairs, wherein the plates are fixed and the flaps are movable with the translational actuator.

16. The high pressure treatment system of claim 15 wherein the flaps are permeable to fluids.

17. The high pressure treatment system of claim 15 wherein the flaps are mounted on the translational actuator in an articulated joint.

18. The high pressure treatment system of claim 12 comprising two bidirectionally acting pistons that are secured to the translational actuator and are displaceable within the high pressure treatment volume.

* * * * *